United States Patent [19]
Gosling

[11] Patent Number: 5,815,661
[45] Date of Patent: *Sep. 29, 1998

[54] PLATFORM INDEPENDENT OBJECT AND OBJECT APPLICATION LOADER AND METHOD

[75] Inventor: James A. Gosling, Woodside, Calif.

[73] Assignee: Sun Microsystems, Inc., Mountain View, Calif.

[*] Notice: The term of this patent shall not extend beyond the expiration date of Pat. No. 5,630,066.

[21] Appl. No.: 802,720

[22] Filed: Feb. 20, 1997

Related U.S. Application Data

[63] Continuation of Ser. No. 359,884, Dec. 20, 1994, Pat. No. 5,630,066.

[51] Int. Cl.⁶ .............................. G06F 9/44; G06F 9/445
[52] U.S. Cl. .............................. 395/200.46; 395/200.76; 395/683
[58] Field of Search .................................. 395/500, 200.4, 395/710, 200.47, 677, 683, 569, 200.42, 200.76, 200.46; 364/DIG. 1, DIG. 2; 707/103

[56] References Cited

U.S. PATENT DOCUMENTS

| | | | |
|---|---|---|---|
| 5,075,847 | 12/1991 | Fromme | 395/700 |
| 5,369,778 | 11/1994 | San Soucie et al. | 364/DIG. 2 |
| 5,386,568 | 1/1995 | Wold et al. | 395/700 |
| 5,421,012 | 5/1995 | Khoyi et al. | 364/DIG. 1 |
| 5,434,992 | 7/1995 | Mattson | 395/425 |
| 5,437,027 | 7/1995 | Bannon et al. | 395/600 |
| 5,630,066 | 5/1997 | Gosling | 395/DIG. 2 |

*Primary Examiner*—Daniel H. Pan
*Attorney, Agent, or Firm*—Gary S. Williams, Esq.; Flehr Hohbach Test Albritton and Herbert

[57] ABSTRACT

A class loader downloads objects and object viewers from remote computer nodes, and invokes locally stored object viewers to view objects. When a user selects an object to view, a conventional downloading of the referenced object is initiated. The class loader, however, utilizes data type information received at the beginning of the object downloading process to determine if a viewer for the referenced object is available on the user's workstation. If an appropriate view is not locally available, the class loader automatically locates an appropriate viewer on the server from which the object is being downloaded, or from any other appropriate server known to the user's workstation. The class loader downloads the located viewer and then invokes a program verification procedure to verify the integrity of the downloaded viewer before the viewer is executed. Once a viewer has been verified, the viewer is added to the user's local viewer library, downloading of the referenced object is completed, and execution of the viewer to view the downloaded object is enabled. If an appropriate viewer cannot be located, or the only viewer located does not pass the verification procedure, downloading of the referenced object is aborted.

13 Claims, 13 Drawing Sheets under this application is a continuation of continuation application Ser. No. 08/359,884, filed Dec. 20, 1994, issued as U.S. Pat. No. 5,630,066.

PLATFORM INDEPENDENT OBJECT AND OBJECT APPLICATION LOADER AND METHOD

This application is a continuation of continuation application Ser. No. 08/359,884, filed Dec. 20, 1994, issued as U.S. Pat. No. 5,630,066.

BACKGROUND OF THE INVENTION

1. Field of the Invention

The present invention relates generally to the use of computer software on multiple computer platforms which use distinct underlying machine instruction sets, and more specifically to a method of verifying the integrity of computer software obtained from a network server or other source.

2. Prior Art

As represented generally in FIG. 1, in a typical prior art networked computer system 100, a first computer 102 may download a computer program 103 residing on a second computer 104. In this example, the first user node 102 will typically be a user workstation having a central processing unit 106, a user interface 108, a primary memory 110 (e.g., random access memory) for program execution, a secondary memory 112 (e.g., a hard disc) for storage of an operating system 113, programs, documents and other data, and a modem or other communication interface 114 for connecting to a computer network 120 such as the internet, a local area network or a wide area network. The computers 102 and 104 are often called "nodes on the networks" or "network nodes."

The second computer 104 will often be a network server, but may be a second user workstation, and typically would contain the same basic array of computer components as the first computer.

In the prior art, after the first computer 102 downloads a copy of a computer program 103 from the second computer 104, there are essentially no standardized tools available to help the user of the first computer 102 to verify the integrity of the downloaded program 103. In particular, unless the first computer user studies the source code of the downloaded program, it is virtually impossible using prior art tools to determine whether the downloaded program 103 will underflow or overflow its stack, or whether the downloaded program 103 will violate files and other resources on the user's computer.

A second issue with regard to downloading computer software from one computer to another concerns transferring computer software between computer platforms which use distinct underlying machine instruction sets. There are some prior art examples of platform independent computer programs and platform independent computer programming languages. What the prior art lacks are reliable and automated software verification tools for enabling recipients of such software to verify the integrity of transferred platform independent computer software obtained from a network server or other source.

Another aspect of the present invention concerns methods for automatically, after a user selects an object or file to download from a remote location, downloading software associated with object or file. For instance, there is widely used feature of the internet known as the "World Wide Webs" (WWW).

When reviewing a document on the internet's World Wide Web (WWW), a page of the document may contain references to other documents or to objects. A user can access such other documents or objects by selecting a given object via an associated hyperlink. Such selection is usually performed by a user, in conjunction with a graphical user interface on a workstation node, by depressing a button on a pointer device while using the pointer device to point at a graphical image representing the hyperlink selection. In response to selection of a hyperlink, the user's Web access program will then open a connection to the server on which the referenced document of object resides (as indicated by data embedded in the hyperlink in the document or object currently being viewed), and downloads the referenced document or object. However, if the downloaded document or object is of a data type unknown to the user's Web access program, the user will be unable to view or otherwise utilize the downloaded document.

When this happens, the user will often attempt to manually locate a viewer for the downloaded document or object by looking through libraries of programs on the server from which the document or object was retrieved, or on other servers. If a viewer is found that is compatible with the user's computer platform, the user may download the viewer and then execute it so as to view the previously downloaded object. However, there are some significant risks to the user associated with executing a viewer of unknown origin. For instance, the downloaded viewer program may have embedded "virus" programs that will compromise the integrity of the user's computer, or the downloaded program itself may access resources and/or destroy information on the user's computer, contrary to the user's wishes. The present invention overcomes these difficulties by providing automatic downloading of viewers for documents and objects and automatic integrity verification of those programs before the downloaded viewer can be executed.

SUMMARY OF THE INVENTION

The present invention is a "class loader" for retrieving (i.e., downloading) objects and object viewers from remote computer nodes, and for invoking locally stored object viewers to view objects. When a user selects an object to view, such as by using the hyperlink feature of the World Wide Web, a conventional downloading of the referenced object is initiated. The class loader of the present invention, however, utilizes data type information received at the beginning of the object downloading process to determine whether a viewer for the referenced object is available on the user's workstation.

If an appropriate viewer is not locally available, the class loader automatically locates an appropriate viewer on the server from which the object is being downloaded, or from any other appropriate server known to the user's workstation. The class loader downloads the located viewer and then invokes a program verification procedure to verify the integrity of the downloaded viewer before the viewer is executed. Once a viewer has been verified, the viewer is added to the user's local viewer library, downloading of the referenced object is completed, and execution of the viewer to view the downloaded object is enabled.

If an appropriate viewer cannot be located, or the only viewer located does not pass the verification procedure, downloading of the referenced object is aborted.

The present invention verifies the integrity of computer programs written in a bytecode language, to be commercialized as the OAK language, which uses a restricted set of data type specific bytecodes. All the available source code bytecodes in the language either (A) are stack data consuming bytecodes that have associated data type restrictions as to the types of data that can be processed by each such bytecode, (B) do not utilize stack data but affect the stack by either adding data of known data type to the stack or by removing data from the stack without regard to data type, or (C) neither use stack data nor add data to the stack.

The present invention provides a verifier tool and method for identifying, prior to execution of a bytecode program, any instruction sequence that attempts to process data of the wrong type for such a bytecode or if the execution of any bytecode instructions in the specified program would cause underflow or overflow of the operand stack, and to prevent the use of such a program.

The bytecode program verifier of the present invention includes a virtual operand stack for temporarily storing stack information indicative of data stored in a program operand stack during the execution a specified bytecode program. The verifier processes the specified program by sequentially processing each bytecode instruction of the program, updating the virtual operand stack to indicate the number, sequence and data types of data that would be stored in the operand stack at each point in the program. The verifier also compares the virtual stack information with data type restrictions associated with each bytecode instruction so as to determine whether, during program execution, the operand stack would contain data inconsistent with the data type restrictions of the bytecode instruction, and also determines whether any bytecode instructions in the specified program would cause underflow or overflow of the operand stack.

To avoid detailed analysis of the bytecode program's instruction sequence flow, and to avoid verifying bytecode instructions multiple times, all points (called multiple-entry points) in the specified program that can be can be immediately preceded in execution by two or more distinct bytecodes in the program are identified. In general, at least one of the two or more distinct bytecodes in the program will be a jump/branch bytecode. During processing of the specified program, the verifier takes a "snapshot" of the virtual operand stack immediately prior to each multiple-entry point (i.e., subsequent to any one of the preceding bytecode instructions), compares that snapshot with the virtual operand stack state after processing each of the other preceding bytecode instructions for the same multiple-entry point, and generates a program fault if the virtual stack states are not identical.

BRIEF DESCRIPTION OF THE DRAWINGS

The accompanying drawings, which are incorporated in and form a part of this specification, illustrate embodiments of the invention and, together with the description, serve to explain the principles of the invention, wherein:

FIGS. 6 and 6A–G represent a flow chart of the bytecode program verification process in the preferred embodiment of the present invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
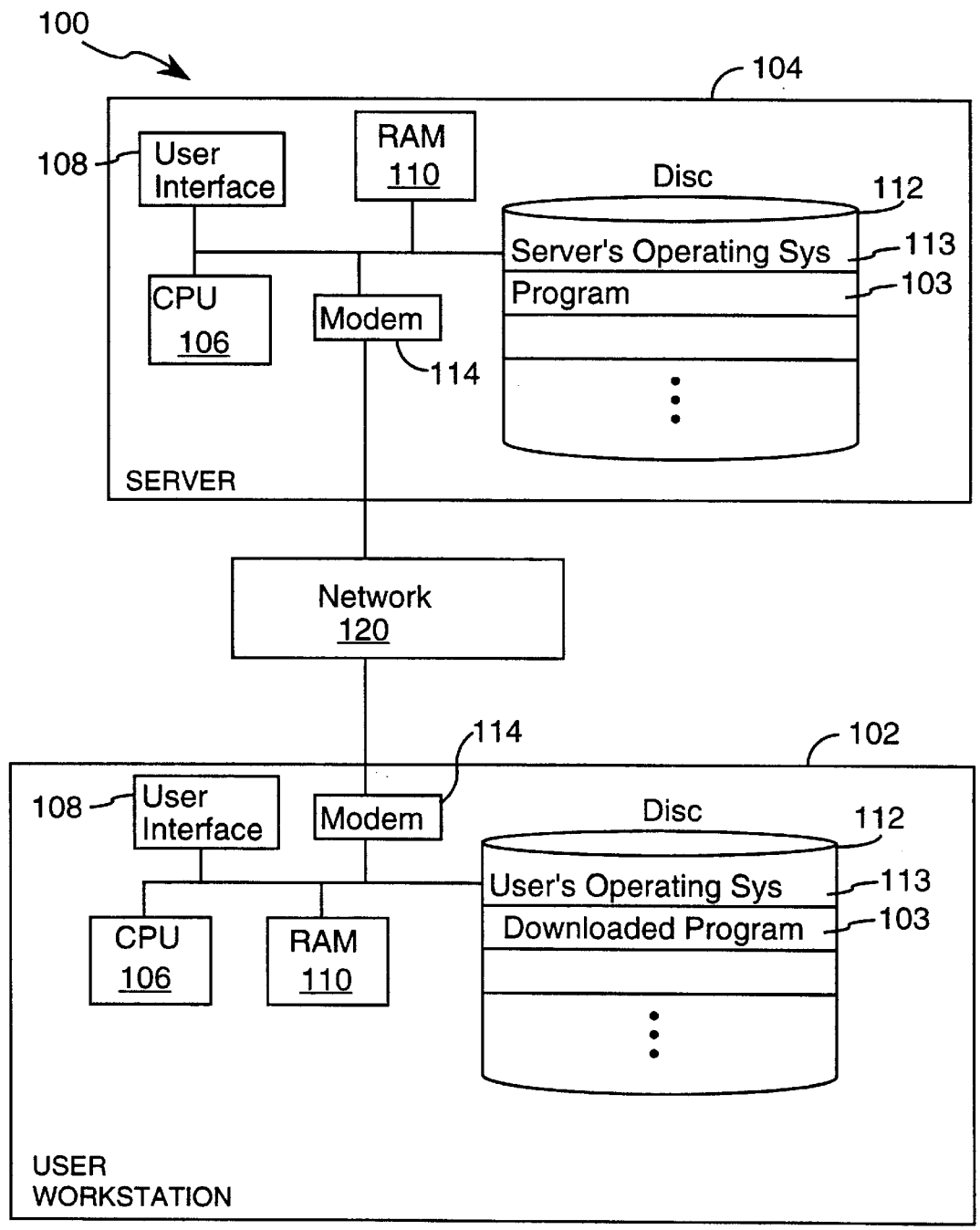
FIG. 1 depicts two computers interconnected via a network.
Figure 2:
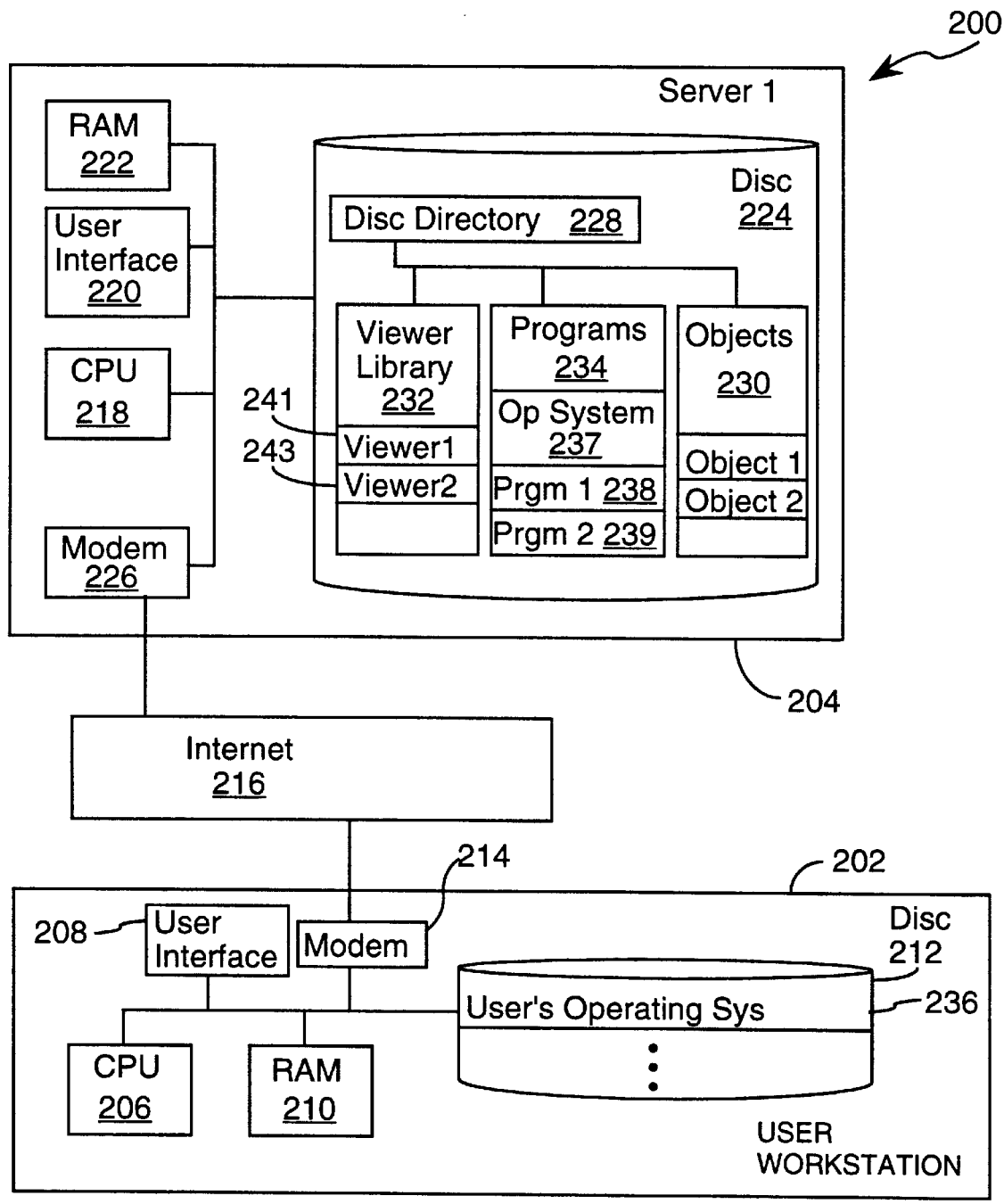
FIG. 2 depicts two computers interconnected via a network, at least one of which includes a secondary storage device for storing multiple copies of a source program in different executable forms.

Referring now to a distributed computer system 200 as shown in FIG. 2, a first computer node 202 is connected to a second computer node 204 via a computer communications network 216 such as the Internet. The first computer node 202 includes a central processing unit 206, a user interface 208, primary memory (RAM) 210, secondary memory (disc storage) 212, and a modem or other communication interface 214 that connects the first computer node 202 to the computer communication network 216. The disc storage 212 stores programs for execution by the processor 206, as well as data files and other information.

The second computer node 204, assumed here to be configured as a file or other information server, includes a central processing unit 218, a user interface 220, primary memory (RAM) 222, secondary memory (disc storage) 224, and a modem or other communication interface 226 that connects the second computer node to the computer communication network 216. The disc storage 224 includes a file and/or object directory 228 (sometimes called a disc directory or catalog) for locating information stored in secondary memory 224, objects 230, a viewer library 232 and other programs 234 for execution by the processor 218 and/or distribution to other computer nodes.

The first and second computer nodes 202 and 204 may utilize different computer platforms and operating systems 236, 237 such that object code programs executed on either one of the two computer nodes cannot be executed on the other. For instance, the server node 204 might be a Sun Microsystems computer using a Unix operating system while the user workstation node 202 may be an IBM compatible computer using an 80486 microprocessor and a Microsoft DOS operating system. Furthermore, other user workstations coupled to the same network and utilizing the same server 204 might use a variety of different computer platforms and a variety of operating systems.

In the past, a server 204 used for distributing software on a network having computers of many types would store multiple distinct libraries (e.g., multiple, distinct viewer libraries 232) of software for each of the distinct computer platform types (e.g., Unix, Windows, DOS, Macintosh, etc.). Accordingly, in order to support the needs of the various system users, a server would be required to store both a plurality of versions of the same computer program (238 and 239) as well as a plurality of object viewers (241 and 243), one for each computer platform type. However, using the present invention, many varied users can be supported through the distribution of a single bytecode version of the program.

Figure 3:
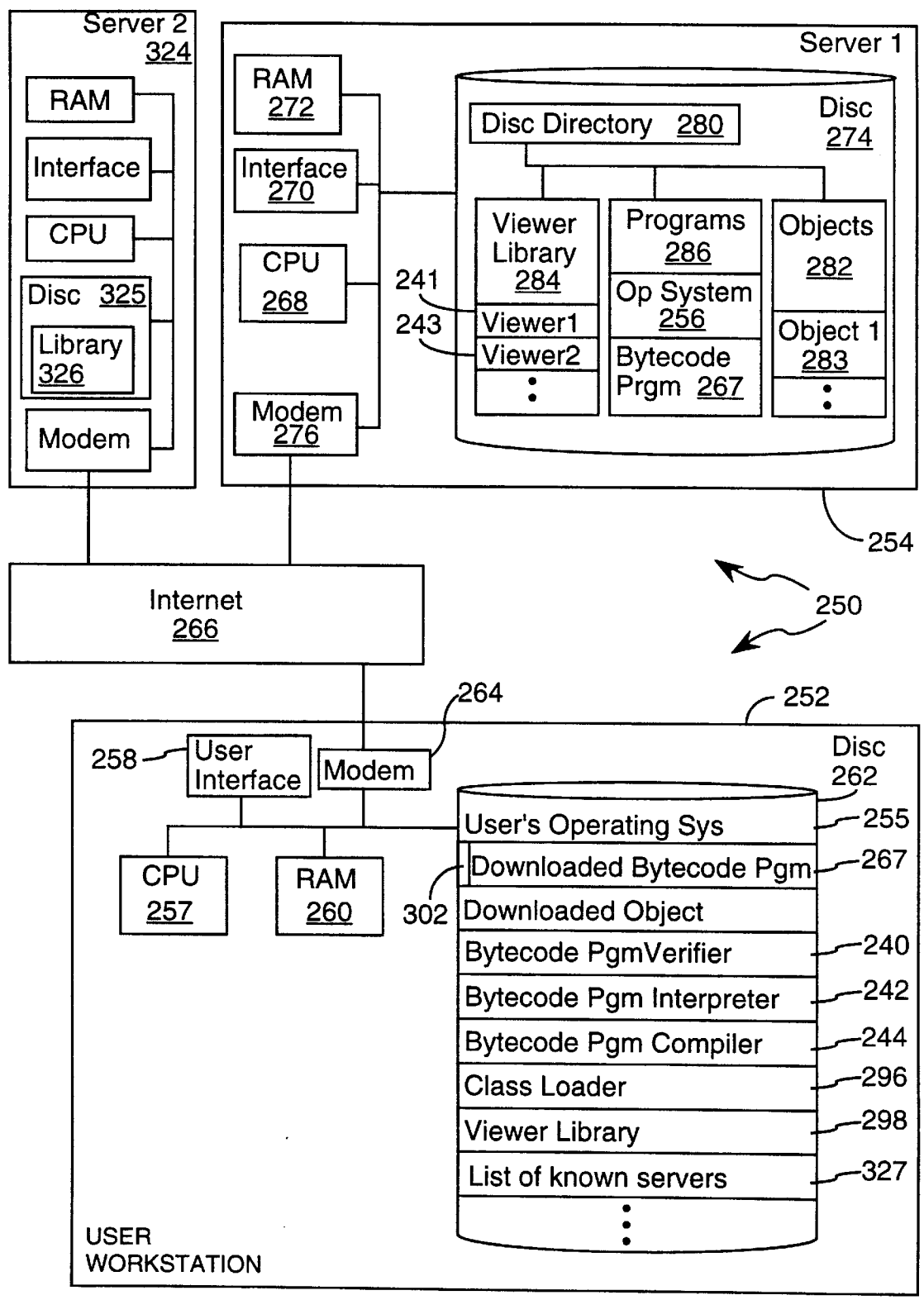
FIG. 3 depicts two computers interconnected via a network, at least one of which includes a bytecode program verifier and class loader in accordance with the present invention.

Referring now to FIG. 3, a distributed computer system 250 incorporating the teachings of the present invention is shown. A first computer node 252 is connected to a second computer node 254 via a computer communications network 266 such as the Internet. Again, just as in the prior art, the first and second computer nodes 252 and 254 may utilize different computer platforms and operating systems 255, 256 such that object code programs executed on either one of the two computer nodes cannot be executed on the other. For instance, the server node 254 might be a Sun Microsystems computer using a Unix operating system while the user workstation node 252 may be an IBM compatible computer using an 80486 microprocessor and a Microsoft DOS operating system as was described above in conjunction with FIG. 2. The first computer node 252 includes a central processing unit 257, a user interface 258, primary memory (RAM) 260, secondary memory (disc storage) 262, and a modem or other communication interface 264 that connects the first computer node 252 to the computer communication network 266. The disc storage 262 stores programs for execution by the processor 257, at least one of which is a bytecode program 267 which is of executable form. For the purposes of this description, it will be assumed that the first computer node 252 receives the bytecode program 267 from the second computer node 254 via the computer communications network 266, the details of which will be described in greater detail below in conjunction with the class loader.

In the preferred embodiment, the bytecode program is written as an OAK application, which when compiled or interpreted will result in a series of executable instructions. A listing of all the source code bytecode instructions in the OAK instruction set is provided in Table 1. The OAK instruction set is characterized by bytecode instructions that are data type specific. Specifically, the OAK instruction set distinguishes the same basic operation on different primitive data types by designating separate opcodes. Accordingly, a plurality of bytecodes are included within the instruction set to perform the same basic function (for example to add two numbers), with each such bytecode being used to process only data of a corresponding distinct data type. In addition, the OAK instruction set is notable for instructions not included. For instance, there are no "computed goto" instructions in the OAK language instruction set, and there are no instructions for modifying object references or creating new object references (other than copying an existing object reference). These two restrictions on the OAK instruction set, as well as others, help to ensure that any bytecode program which utilizes data in a manner consistent with the data type specific instructions in the OAK instruction set will not violate the integrity of a user's computer system.

In the preferred embodiment, the available data types are integer, long integer, short integer (16 bit signed integer), single precision floating point, double precision floating point, byte, character, and object pointer (sometimes herein called an object reference). The "object reference" data type includes a virtually unlimited number of data subtypes because each "object reference" data type can include an object class specification as part of the data type. In addition, constants used in programs are also data typed, with the available constant data types in the preferred embodiment comprising the data types mentioned above, plus class, fieldref, methodref, string, and Asciz, all of which represent two or more bytes having a specific purpose.

The few bytecodes that are data type independent perform stack manipulation functions such as (A) duplicating one or more words on the stack and placing them at specific locations within the stack, thereby producing more stack items of known data type, or (B) clearing one or more items from the stack. A few other data type independent bytecode do not utilize any words on the stack and leave the stack unchanged, or add words to the stack without utilizing any of the words previously on the stack. These bytecodes do not have any data type restrictions with regard to the stack contents prior to their execution, but all modify the stack's contents in a totally predictable manner with regard to the data types of the items in the stack. As a result, the number of operands in the stack and the data type of all operands in the stack can be predicted (i.e., computed) with 100% confidence at all times.

The second computer node 254, assumed here to be configured as a file or other information server, includes a central processing unit 268, a user interface 270, primary memory (RAM) 272, secondary memory (disc storage) 274, and a modem or other communication interface 276 that connects the second computer node to the computer communication network 266. The disc storage 274 is comprised of a directory 280, objects 282 including a first object 283, a viewer library 284 and programs 286 for execution by the processor 268 and/or distribution to other computer nodes, at least one of which is the bytecode program 267 for transfer to computer node 252.

As shown in FIG. 3, the first computer node 252 stores in its secondary memory 262 a class loader program 296 for retrieving (i.e., downloading) objects and object viewers from other computer nodes, and for invoking a locally stored object viewers to view objects. The class loader 296 also automatically verifies (at the site of the end user's workstation node) downloaded object viewers to verify the integrity of each viewer before it is executed by each user.

For the purposes of this document, an "object" that may be "viewed" using an associated viewer can be either (A) a data-only type of object, such as a file other data structure that contains data of a specific type or format, such as JPEG, GIF, MPEG, or MPEG2 data, without having any embedded method or software, or (B) a method-storing object, such as a file or other data structure that includes one or more embedded methods, and optionally data as well. For instance, distinct viewers may be needed for viewing data-only objects that store distinct image data types, such as JPEG and GIF, and for viewing data-only objects that store distinct video program data types such as MPEG and MPEG2. Other examples might be distinct viewers for viewing charts of data, viewers with built-in data decryption software for viewing encrypted data (when the decryption key is known to the user), and so on.

In addition, distinct viewers may be needed for method-storing objects using different internal program types. For instance, different internal program types in various method-storing objects might use distinct scripting languages or might assume the availability of different libraries of utility programs, thereby requiring different viewers.

A "viewer" (sometimes called an interpreter) decodes data and/or instructions in a specified object, and generally performs whatever computations and operations are needed to make objects of a particular data type or class usable. In the present invention, such object viewers are bytecode programs, written in a source code bytecode language so that the integrity of each object viewer can be independently verified by an end user through execution of a bytecode program verifier 240. Bytecode program verification is discussed in more detail below.

It should be noted that a distributed computer system 250 may include platform independent object viewers in accordance with the present invention as well as other object viewers which are not platform independent and which cannot be verified using the bytecode program verifier 240 and class loader 296 tools of the present invention. In such a hybrid system, the automated viewer integrity verification benefits of the present invention will be provided for bytecode viewer programs, but not for other viewer programs.

The class loader 296 is an executable program for loading and verifying objects and object viewers from a remote server. When reviewing a document on the Internet's World Wide Web (WWW) for example, a page of the document may contain references to other documents or to objects. A user can access such other documents or objects by selecting a given object via an associated hyperlink. Such selection is usually performed by a user, in conjunction with a graphical user interface on a workstation node, by depressing a button on a pointer device while using the pointer device to point at a graphical image representing the hyperlink selection.

During the selection process, the document or object which is currently being viewed may contain references to other documents or objects, including some having a data type which is unknown to the user's workstation. The class loader of the present invention is utilized to both locate a viewer associated with a "foreign" data type, and to verify program integrity of all downloaded bytecode programs prior to their execution by the user.

The class loader 296 performs three primary functions. First the class loader checks the data types of downloaded objects [and their associated bytecode programs] to determine if the user workstation has an associated viewer in a "viewer library" 298 in its own local storage 262. Secondly, if the class loader can not locate the appropriate viewer, it executes a search routine at both the source server and other servers it has knowledge of to locate and download the proper viewer. If no viewer can be located, then the object and/or bytecode program which has been down loaded is rejected for want of an appropriate viewer. Finally, upon locating the appropriate viewer at a remote source, the class loader invokes execution of a bytecode verifier 240 to check the downloaded viewer prior to the execution of viewer in conjunction with a bytecode program interpreter 242 or compilation by a bytecode program compiler 244. After verification, the downloaded viewer may be stored in the user's local viewer library 298.

Figure 4:
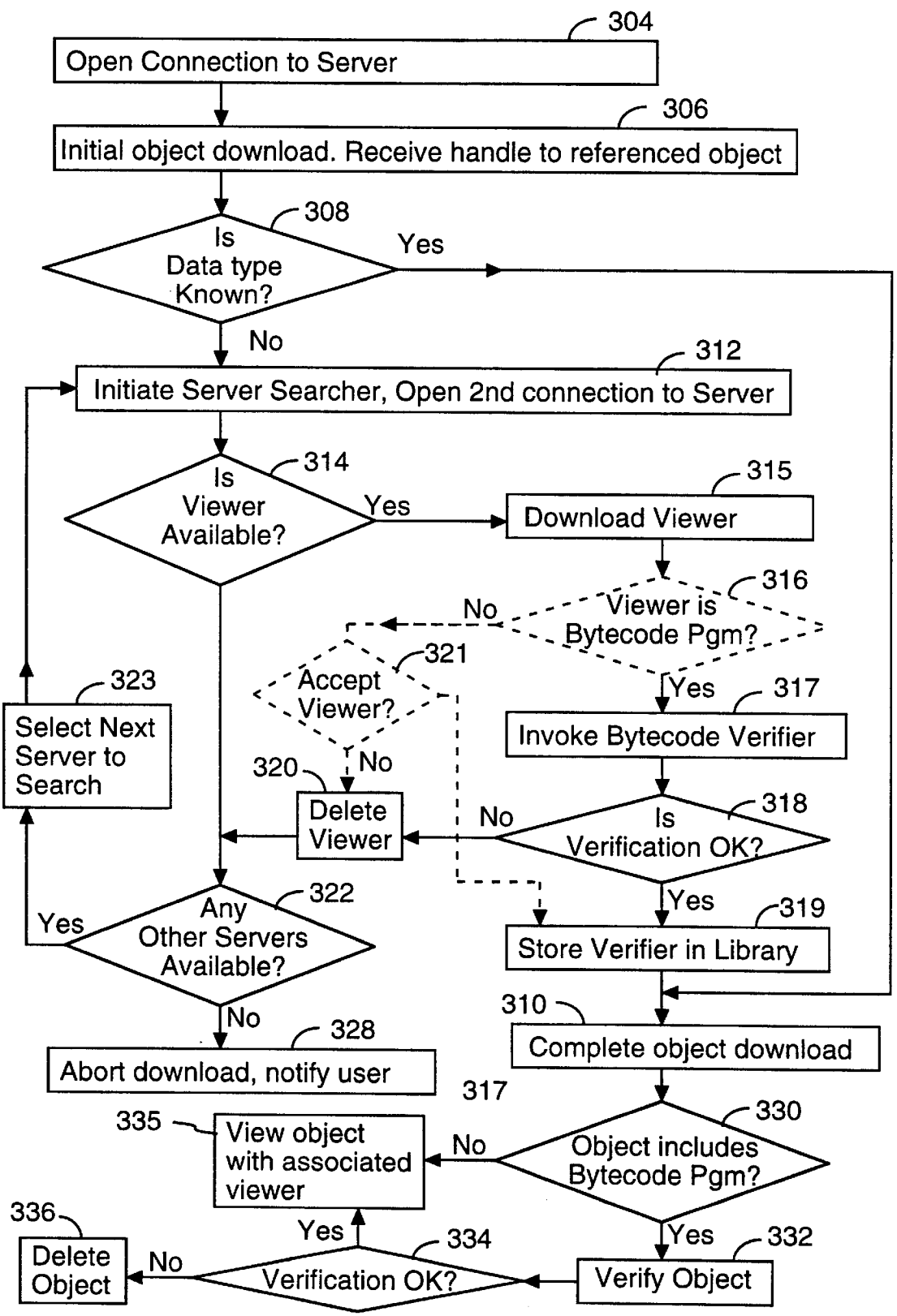
FIG. 4 represents a flow chart of the loading process for accessing a bytecode program and viewer stored in a remote server according to the preferred embodiment of the present invention.

Referring now to FIGS. 3 and 4 and Appendix 1, the execution of the class loader program 296 will be described in detail for retrieving a bytecode program via an associated object. Appendix 1 lists a pseudocode representation of the class loader program. The pseudocode used in Appendix 1 is, essentially, a computer language using universal computer language conventions. While the pseudocode employed here has been invented solely for the purposes of this description, it is designed to be easily understandable by any computer programmer skilled in the art.

As shown in FIG. 4, the user workstation 252 begins a download process by opening (304) a connection to a server 254 which contains an object 283 to be downloaded. The class loader 296 initiates (306) the transfer of the object bytecode program by hyperlink selecting the object, whereupon the server 254 transfers a "handle" for the referenced object to the user workstation 252. The handle is retrieved prior to the body of the referenced object and contains information concerning properties of the referenced object, including the object's data type (sometimes called the object class).

A first check (308) is made to determine if the data type associated with the object to be retrieved is known to the user's system. Specifically, the class loader searches a viewer library 298 resident in the secondary storage 262 of the user workstation 252 to see if an appropriate viewer for objects of the determined data type is accessible. The viewer library 298 includes a listing of all of the data type viewers which are currently accessible by the user workstation and their appropriate locations in memory. In this way, the class loader pre-processes the object to be downloaded during the initial handshake in order to determine compatibility with the user workstation platform prior to the actual downloading of the body of the referenced object. If an appropriate viewer is located, then the class loader completes (310) the downloading of the referenced object.

If an appropriate viewer is not located within the viewer library 298, indicating that the selected object is of a data type which is unfamiliar to the user workstation 252, the class loader executes a search for an appropriate viewer. In most circumstances the first place to look for an appropriate viewer is the same server on which the selected object is stored. Thus, the class loader opens (312) a second connection to the same server which is the source of the referenced object and requests (314) a viewer for the indicated data type. If the server contains the appropriate viewer, the viewer is downloaded (315) into the user's workstation.

Upon completion of the download, if the downloaded viewer is a bytecode program (316) the class loader will initiate a verification (317) of the viewer program by invoking the bytecode program verifier 240. The bytecode program verifier 240 is an executable program which verifies operand data type compatibility and proper stack manipulations in a specified bytecode (source) program prior to the execution of the bytecode program by the processor 257. The operation of the bytecode verifier program 240 will be described in greater detail below. If the verification is successful (318), the server searcher will store (319) the verified object viewer in the viewer library 298 and update the directory in the library to reflect the availability of the new data type viewer. If the verification is unsuccessful the downloaded viewer will be deleted (320).

Some embodiments of the present invention allow for the automatic downloading and use of both verifiable and non-verifiable object viewers. In those embodiments, after downloading an object viewer (315), if the downloaded object viewer is not a bytecode program (316), a determination is made (321) whether or not to accept the object viewer. For example, the user may be asked whether or not accept the object viewer, or a default decision to accept or not accept such object viewers may be included a configuration file. If the non-verifiable object viewer is accepted, it is stored in the viewer library (319), and if it is not accepted the downloaded viewer is deleted (320).

If steps 308 and 314 fail to locate a viewer suitable for use with the selected object, because neither the server nor the user workstation contains an appropriate viewer, the class loader expands its search to include other server sites or remote user workstations (e.g., a known server list 327) known to the user's workstation (steps 322 and 323). Referring again to FIG. 3, a second server 324 is shown including a secondary storage 325 having a viewer library 326. If the appropriate viewer is located in the viewer library 326 of the second server 324, then the class loader downloads and verifies the viewer program according to steps 315–321 above. The class loader repeats this process, checking alternate servers until all known resources are exhausted or an appropriate viewer is located and verified. Finally, if no appropriate viewer can be located, downloading of the referenced object is aborted and a user message is generated to inform the user that a viewer for the referenced object could not be located (328).

As indicated above, in the event an appropriate object viewer was already stored in the viewer library 298 on the user's workstation (308) or was successfully downloaded, verified and added to the user's viewer library, the loading of the selected object is completed (310). If the downloaded object includes one or more embedded bytecode programs (330 and is therefore a method-storing object, the bytecode programs in the downloaded object are verified (332) by invoking execution of the bytecode verifier on those embedded programs. If the verifier generates a "success" return code after processing the embedded programs (334), then the downloaded object is viewed with the associated object viewer (335). If the verifier aborts its processing of the embedded program due to detection of a program that does not conform to the verifier's requirements (334), the downloaded object is deleted (336) and an appropriate user message is generated.

In the event that the downloaded object does not include embedded bytecode programs (330), steps 332–334 are skipped and the object is viewed with the appropriate viewer (335).

Referring again to FIG. 3, the first computer node 252 also stores in its secondary memory 262 a bytecode verifier program 240 for verifying the integrity of specified bytecode programs and a bytecode interpreter 242 for executing specified bytecode programs. Alternately, or in addition, the first computer node 252 may store a bytecode compiler 244 for converting a verified bytecode program into an object code program for more efficient execution of the bytecode program than by the interpreter 242.

The bytecode verifier 240 is an executable program which verifies operand data type compatibility and proper stack manipulations in a specified bytecode (source) program prior to the execution of the bytecode program by the processor 257 under the control of the bytecode interpreter 242 (or prior to compilation of the bytecode program by compiler 244). Each bytecode program 267 (including the downloaded object verifier) has an associated verification status value 302 that is initially set to False when the program is downloaded from another location. The verification status value 302 for the program is set to True by the bytecode verifier 240 only after the program has been verified not to fail any of the data type and stack usage tests performed by the verifier 240.

The Bytecode Program Verifier

Figure 5:
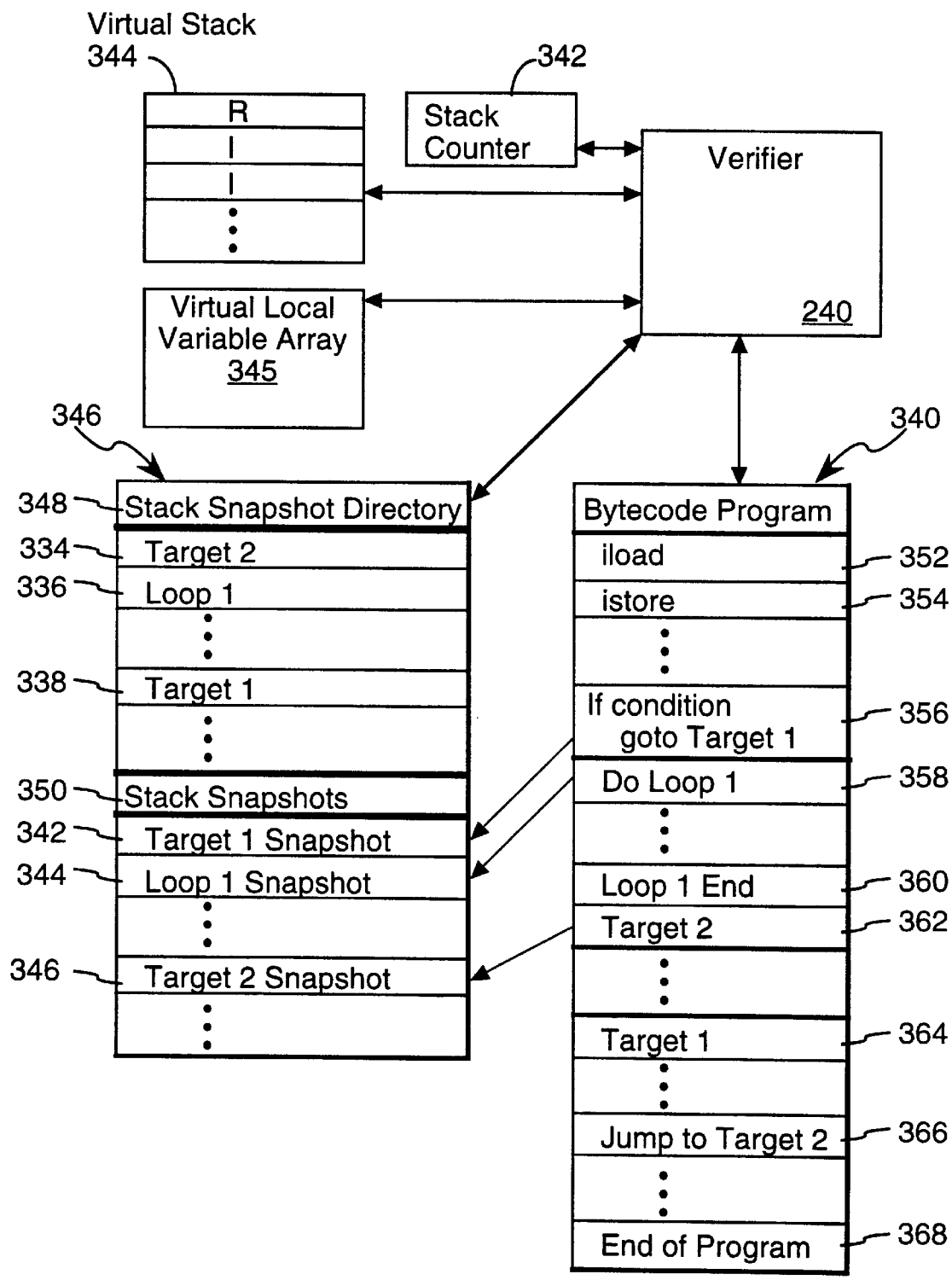
FIG. 5 depicts data structures maintained by a bytecode verifier during verification of a bytecode program in accordance with the present invention.

Referring now to FIG. 5, the execution of the bytecode program verifier 240 will be explained in conjunction with a particular bytecode program 340. The verifier 240 uses a few temporary data structures to store information it needs during the verification process. In particular, the verifier 240 uses a stack counter 342, a virtual stack 344, a virtual local variable array 345, and a stack snapshot storage structure 346.

The stack counter 342 is updated by the verifier 240 as it keeps track of the virtual stack manipulations so as to reflect the current number of virtual stack 344 entries.

The virtual stack 344 stores data type information regarding each datum that will be stored by the bytecode program 340 in the operand stack during actual execution. In the preferred embodiment, the virtual stack 344 is used in the same way as a regular stack, except that instead of storing actual data and constants, the virtual stack 344 stores a data type indicator value for each datum that will be stored in the operand stack during actual execution of the program. Thus, for instance, if during actual execution the stack were to store three values:

| Handle ToObjectA |
| 5 |
| 1 | the corresponding virtual stack entries will be

| R |
| I |
| I | where "R" in the virtual stack indicates an object reference and each "I" in the virtual stack indicates an integer. Furthermore, the stack counter 342 in this example would store a value of 3, corresponding to three values being stored in the virtual stack 344.

Data of each possible data type is assigned a corresponding virtual stack marker value, for instance: integer (I), long integer (L), single precision floating point number (F), double precision floating point number (D), byte (B), short (S), and object reference (R). The marker value for an object reference will often include an object class value (e.g., R:point, where "point" is an object class).

The virtual local variable array 345 serves the same basic function as the virtual stack 344. That is, it is used to store data type information for local variables used by the specified bytecode program. Since data is often transferred by programs between local variables and the operand stack, the bytecode instructions performing such data transfers and otherwise using local variables can be checked to ensure that the local variables accessed by each bytecode instruction are consistent with the data type usage restrictions on those bytecode instructions.

In operation, the verifier 240 processes each bytecode instruction which requests datum to be popped off the stack and pops off the same number of data type values off the virtual stack 344. The verifier then compares the "popped" data type values from the virtual stack 344 with the data type requirements of the bytecode instruction. Similarly, for each bytecode instruction requesting datum to be pushed onto the stack, the verifier pushes onto the virtual stack a corresponding data type value.

One aspect of program verification in accordance with present invention is verification that the number and data type of the operands in the operand stack status is identical every time a particular instruction is executed. If a particular bytecode instruction can be immediately preceded in execution by two or more different instructions, then the virtual stack status immediately after processing of each of those different instructions must be compared. Usually, at least one of the different preceding instructions will be a conditional or unconditional jump or branch instruction. A corollary of the above "stack consistency" requirement is that each program loop must not result in a net addition or reduction in the number of operands stored in the operand stack.

The stack snapshot storage structure 346 is used to store "snapshots" of the stack counter 342 and virtual stack 344 to enable efficient comparison of the virtual stack status at various points in the program. Each stored stack snapshot is of the form:

SC, DT1, DT2, DT3, . . . , DTn where SC is the stack counter value, DT1 is the first data type value in the virtual operand stack, DT2 is the second data type value in the virtual operand stack, and so on through DTn which is the data type value for the last possible item in the virtual operand stack.

The stack snapshot storage structure 346 is bifurcated into a directory portion 348 and a snapshot storage portion 350. The directory portion 348 is used to store target instruction identifiers (e.g., the absolute or relative address of each target instruction) while the snapshot portion 350 is used to store virtual stack 344 snapshots associated with the target instruction identifiers.

"Target" instructions are defined to be all bytecode instructions that can be the destination of a jump or branch instruction. For example, a conditional branch instruction includes a condition (which may or may not be satisfied) and a branch indicating to which location (target) in the program the execution is to "jump" in the event the condition is satisfied. In evaluating a conditional jump instruction, the verifier 240 utilizes the stack snapshot storage structure 346 to store both the identity of the target location (in the directory portion 348) and the status of the virtual stack 344 (in the snapshot portion 350) just before the jump. The operation of the stack snapshot storage structure 346 will be explained in greater detail below in conjunction with the description of the execution of the bytecode verifier program.

As was described previously, the bytecode program 340 includes a plurality of data type specific instructions, each of which is evaluated by the verifier 240 of the present invention. The bytecode program 350 includes instructions for stack manipulations 352 and 354 (push integer onto the stack and pop integer from the stack respectively), a forward jump 356 and its associated target 364, a backwards jump 366 and its associated target 362, and a do loop 358 and its associated end 360 (which may be an unconditional or conditional branch instruction, depending on the type of do loop). Since the verifier 240 of the preferred embodiment of the present invention only seeks to verify stack manipulations and data type compatibilities, the operation of the bytecode verifier can be explained using this representative set of instructions.

Referring now to FIGS. 6A–6G, and Appendix 2, the execution of the bytecode verifier program 240 will be described in detail. Appendix 2 lists a pseudocode representation of the verifier program. The pseudocode used in Appendix 2 is, essentially, a computer language using universal computer language conventions. While the pseudocode employed here has been invented solely for the purposes of this description, it is designed to be easily understandable by any computer programmer skilled in the art.

Figure 6A:
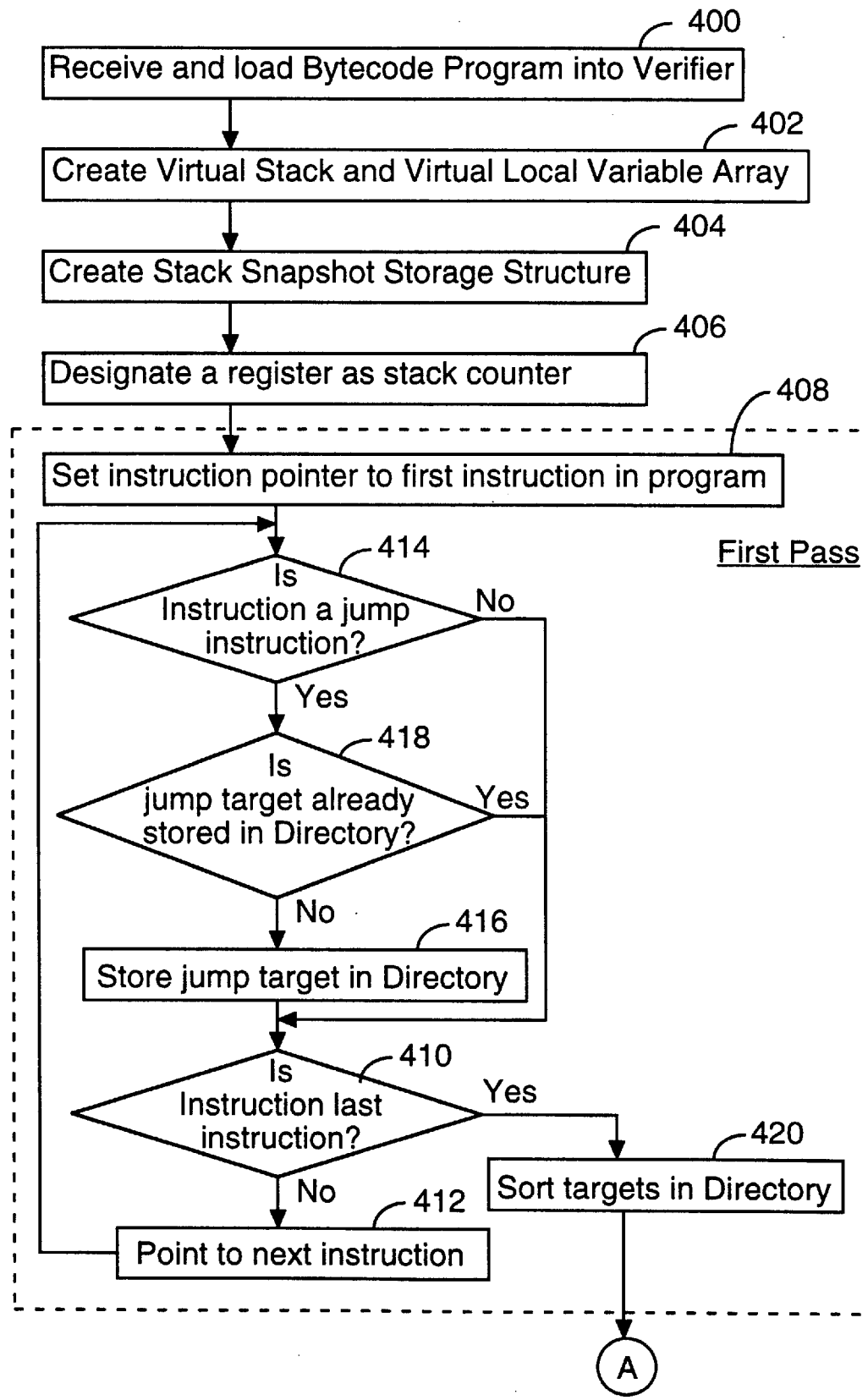

As shown in FIG. 6A, the downloaded bytecode program is loaded (400) into the bytecode verifier 240 for processing. The verifier 240 creates (402) the virtual stack 344 and creates the virtual local variable array 345 by designating arrays of locations in memory to store operand and local variable data type information. Similarly, the verifier creates (404) the stack snapshot storage structure by designating an array of locations in memory to store snapshot information. Finally, the verifier designates (406) a register to act as a stack counter 342 for keeping track of the number of virtual stack entries.

A first pass is made through the bytecode program in order to extract target information associated with conditional and un-conditional jumps and loop instructions. In this first pass the verifier 300 sequentially processes all the instructions (steps 408, 410, 412), and for each instruction that is a conditional or unconditional jump (step 414) a representation of the target location for the jump is stored (step 416) in the directory portion 348 of the stack snapshot storage structure 346, unless (step 418) the target location has already been stored in the directory 348. For instance, the absolute or relative address of the target instruction may be stored in the next available slot of the directory 348. All other types of bytecode instructions are ignored on this first pass.

After all the instructions in the program have been processed, the directory 348 is preferably sorted (420) to put the target locations noted in the directory in address sequential order.

Referring again to FIG. 5, for the purposes illustration the stack snapshot storage structure 346 has been loaded with the information which would have been stored in the directory portion 348 as if the first pass of the verification had been completed based on the bytecode instructions shown in bytecode program 350. Specifically, the directory portion has been loaded with the addresses associated with all of the targets of the conditional and unconditional jumps resident in the bytecode program.

Figure 6B:
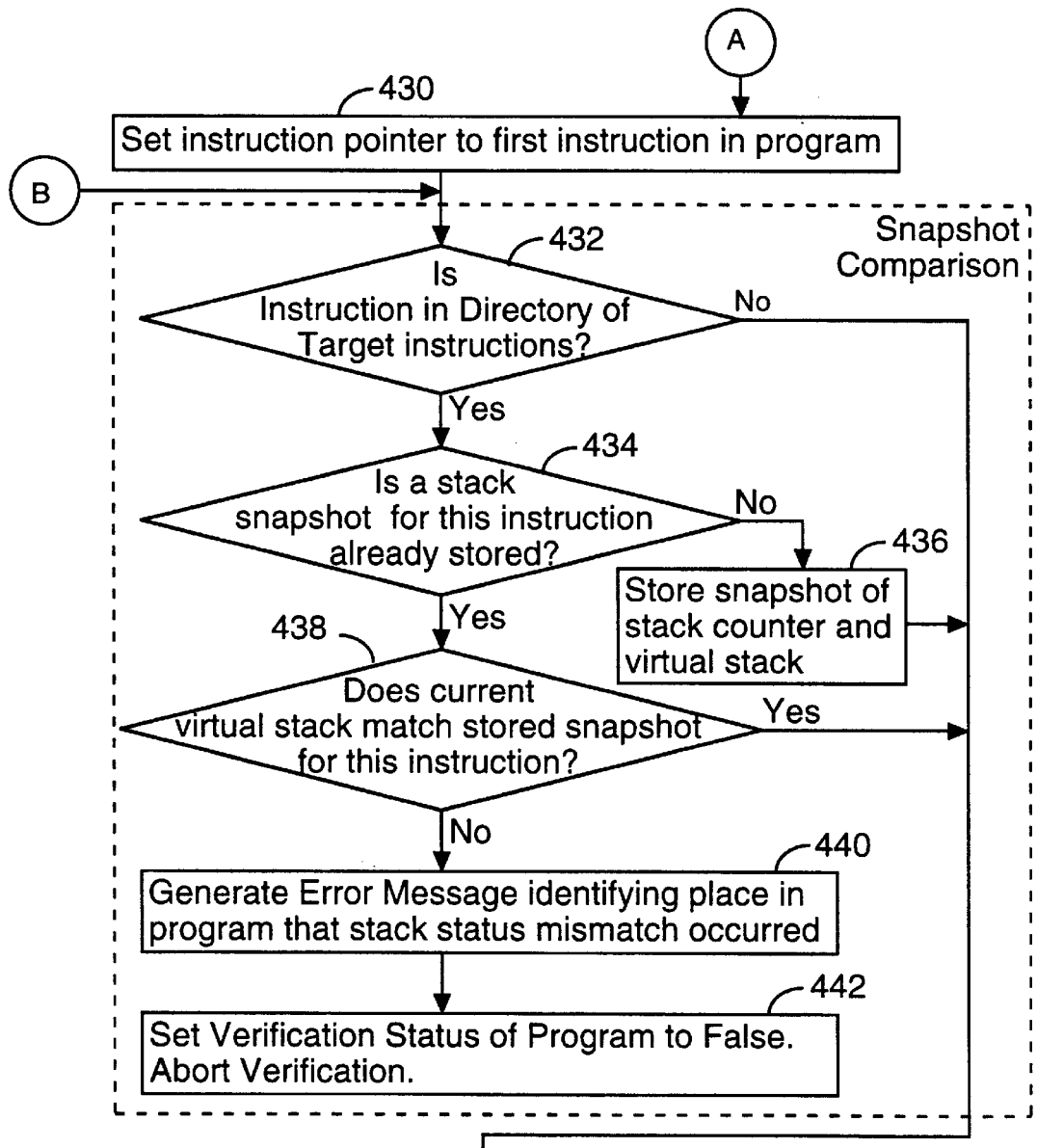

Referring now to FIG. 6B, a second pass through the bytecode program is initiated in order to verify proper use of the operand stack and of data types by the bytecode program. The first instruction of the bytecode program is selected (430) and the verifier first checks (432) to see if the address for the selected instruction has been stored in the directory portion 348 of the stack snapshot storage structure 346 in the first pass described above.

If the address of the selected instruction is in the directory 348, indicating that the selected instruction is the target of a conditional or un-conditional jump, the verifier checks (434) to see if an associated stack snapshot has been stored in the snapshot portion 350 of the stack snapshot storage structure 346. If a stack snapshot has not been stored (indicating that the instruction is a target of a backward jump), then the contents of the virtual stack and the stack counter are stored (436) in the stack snapshot storage structure 346. The snapshot contains information on the status of the virtual stack just before the execution of the instruction being processed, including a data type value for each datum that has been pushed onto the stack. The verifier will then continue the verification process and analyze the individual instruction, starting at step 450, as described below.

If a stack snapshot has been stored for the currently selected instruction (indicating that a jump instruction associated with this target instruction has already been processed), then the verifier compares (438) the virtual stack snapshot information stored in the snapshot portion 350 of the stack snapshot storage structure 346 for the currently selected instruction with the current state of the virtual stack. If the comparison shows that the current state and the snapshot do not match, then an error message or signal is generated (440) identifying the place in the bytecode program where the stack status mismatch occurred. In the preferred embodiment, a mismatch will arise if the current virtual stack and snapshot do not contain the same number or types of entries. The verifier will then set a verification status value 245 for the program to false, and abort (442) the verification process. Setting the verification status value 245 for the program to false prevents execution of the program by the bytecode interpreter 242 (FIG. 3).

If the current virtual stack and the stored stack snapshot for the current instruction match (438), then the verifier will continue the verification process and analyze the individual instruction, starting at step 450, as described below.

If the address of the currently selected instruction is not found within the directory portion 348 of the stack snapshot storage structure 346 or if a stack status mismatch is not detected, then the verifier performs selected ones of a series of checks on the instruction depending on the particular instructions stack usage and function.

Figure 6C:
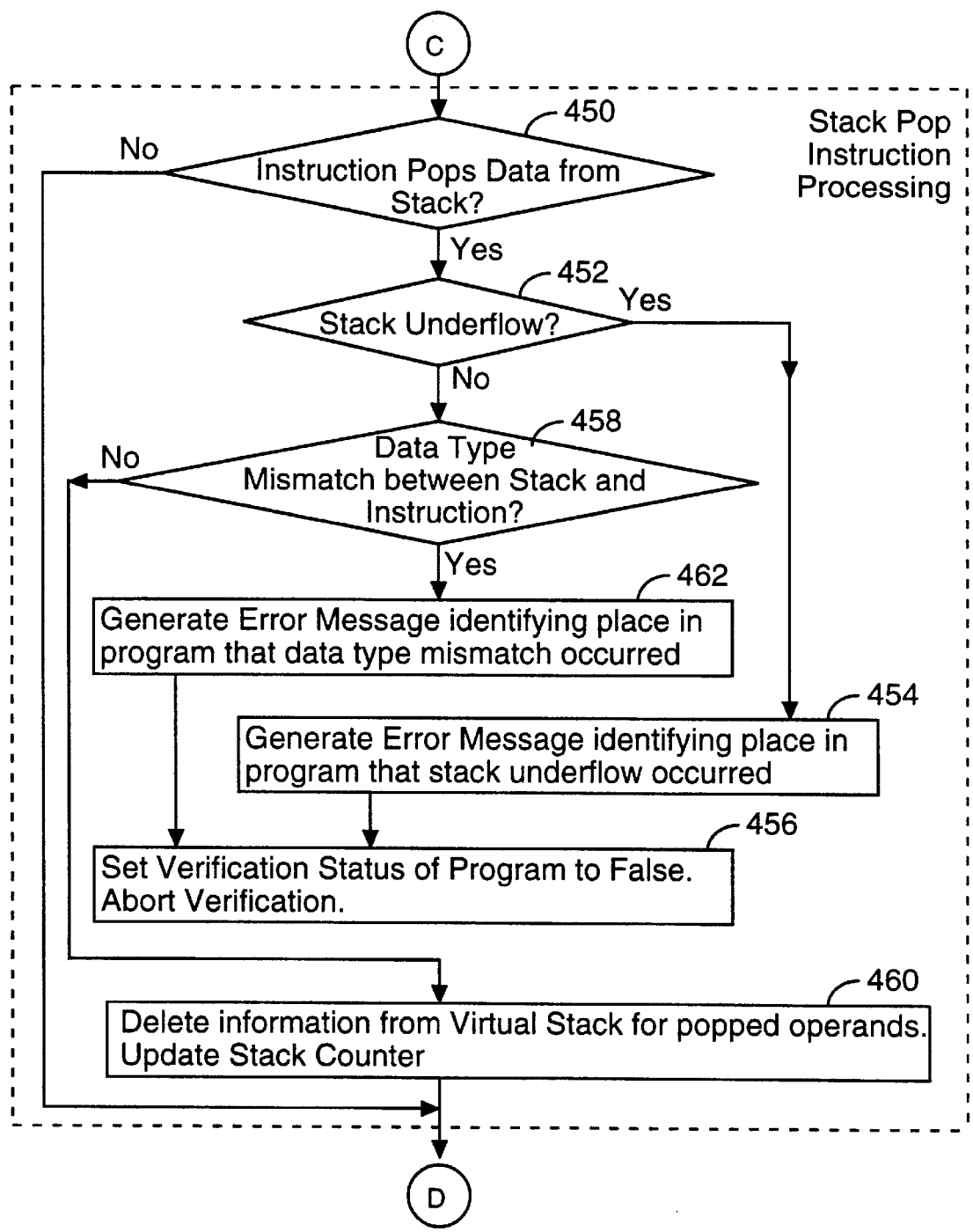

Referring to FIG. 6C, the first check to be performed concerns instructions that pop data from the operand stack. If the currently selected instruction pops data from the stack (450), the stack counter is inspected (452) to determine whether there is sufficient data in the stack to satisfy the data pop requirements of the instruction.

If the operand stack has insufficient data (452) for the current instruction, that is called a stack underflow, in which case an error signal or message is generated (454) identifying the place in the program that the stack underflow was detected. In addition, the verifier will then set a verification status value 245 for the program to false, and abort (456) the verification process.

If no stack underflow condition is detected, the verifier will compare (458) the data type code information previously stored in the virtual stack with the data type requirements (if any) of the currently selected instruction. For example, if the opcode of the instruction being analyzed calls for an integer add of a value popped from the stack, the verifier will compare the operand information of the item in the virtual stack which is being popped to make sure that is of the proper data type, namely integer. If the comparison results in a match, then the verifier deletes (460) the information from the virtual stack associated with the entry being popped and updates the stack counter 342 to reflect the number of entries popped from the virtual stack 344.

If a mismatch is detected (458) between the stored operand information in the popped entry of the virtual stack 344 and the data type requirements of the currently selected instruction, then a message is generated (462) identifying the place in the bytecode program where the mismatch occurred. The verifier will then set a verification status value 245 for the program to false and abort (456) the verification process. This completes the pop verification process.

Figure 6D:
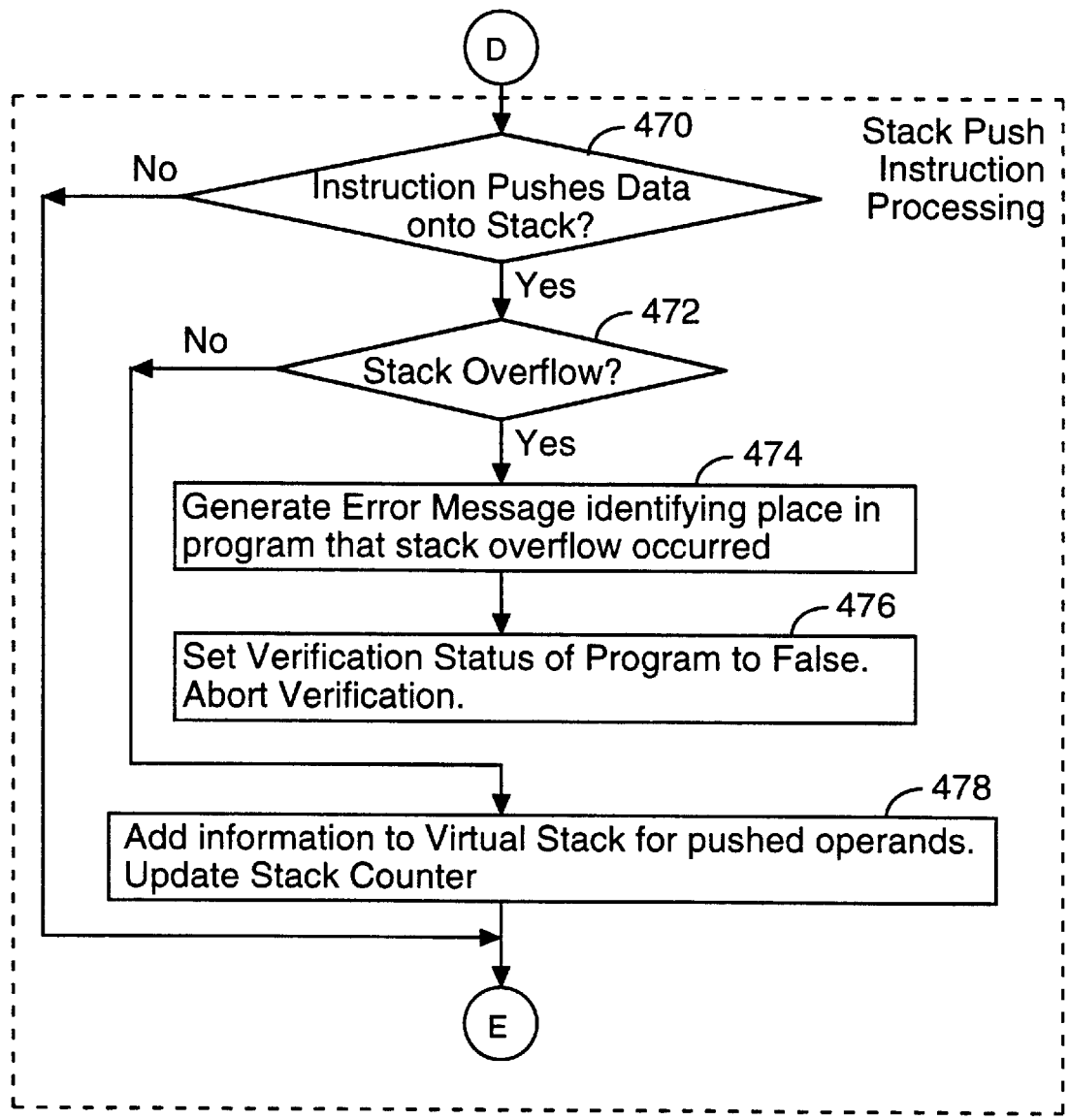

Referring to FIG. 6D, if the currently selected instruction pushes data onto the stack (470), the stack counter is inspected (472) to determine whether there is sufficient room in the stack to store the data the selected instruction will push onto the stack. If the operand stack has insufficient room to store the data to be pushed onto the stack by the current instruction (472), that is called a stack overflow, in which case an error signal or message is generated (474) identifying the place in the program that the stack overflow was detected. In addition, the verifier will then set a verification status value 245 for the program to false, and abort (476) the verification process.

If no stack overflow condition is detected, the verifier will add (478) an entry to the virtual stack indicating the type of data (operand) which is to be pushed onto the operand stack (during the actual execution of the program) for each datum to be pushed onto the stack by the currently selected instruction. This information is derived from the data type specific opcodes utilized in the bytecode program of the preferred embodiment of the present invention. The verifier also updates the stack counter 342 to reflect the added entry or entries in the virtual stack. This completes the stack push verification process.

Figure 6E:
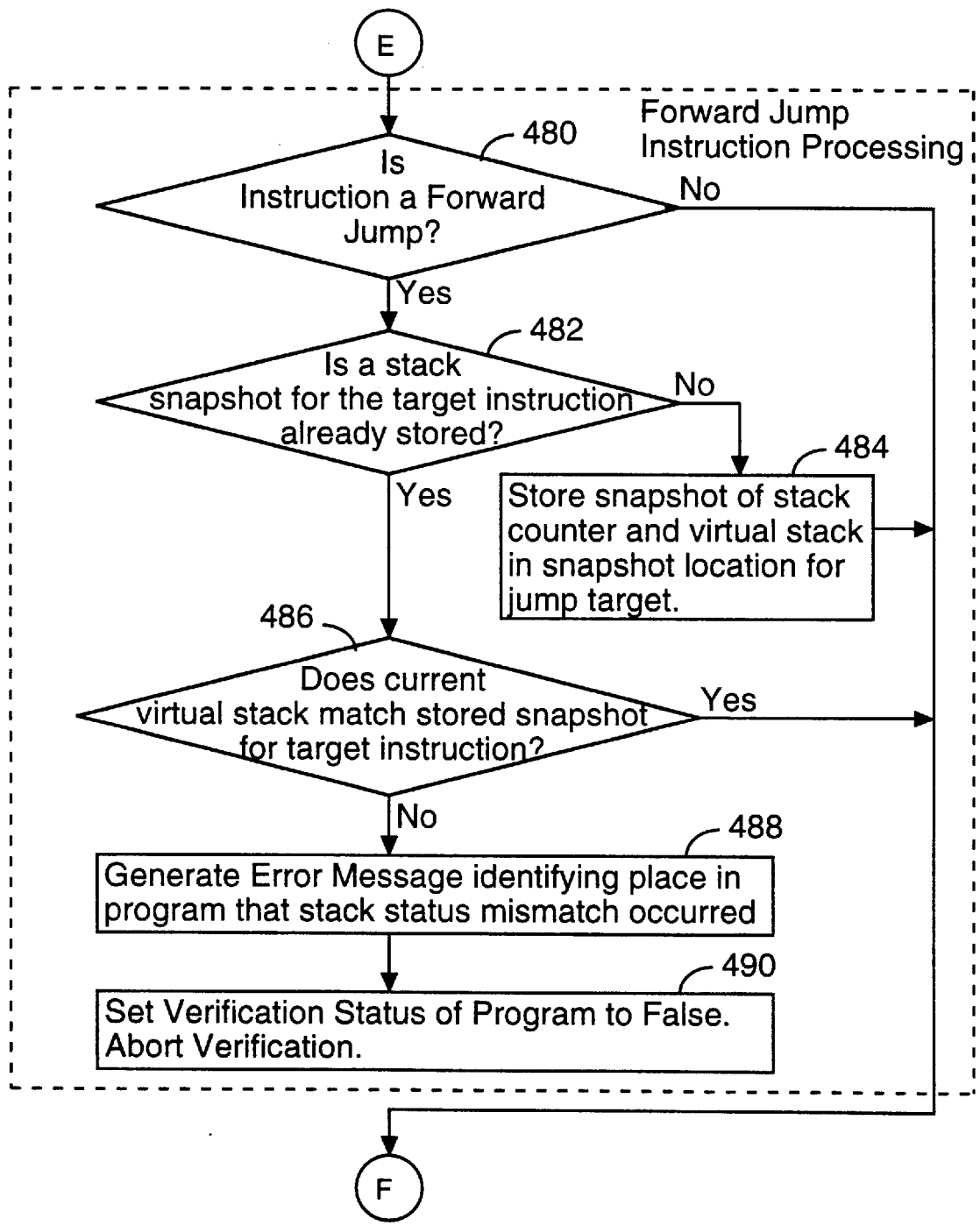

Referring to FIG. 6E, if the currently selected instruction causes a conditional or unconditional jump or branch forward in the program beyond the ordinary sequential step operation (step 480) the verifier will first check (482) to see if a snapshot for the target location of the jump instruction is stored in the stack snapshot storage structure 346. If a stack snapshot has not been stored, then the virtual stack configuration (subsequent to any virtual stack updates associated with the jump) is stored (484) in the stack snapshot storage structure 346 at a location associated with the target program location. Note that any stack pop operations associated with the jump will have already been reflected in the virtual stack by the previously executed stop 460 (see FIG. 6C).

If a stack snapshot has been stored (indicating that another entry point associated with this target instruction has already been processed), then the verifier compares (486) the virtual stack snapshot information stored in the snapshot portion 350 of the stack snapshot storage structure 346 with the current state of the virtual stack. If the comparison shows that the current state and the snapshot do not match, then an error message is generated (488) identifying the place in the bytecode program where the stack status mismatch occurred. In the preferred embodiment, a mismatch will arise if the current virtual stack and snapshot do not contain the same number or types of entries. Furthermore, a mismatch will arise if one or more data type values in the current virtual stack do not match corresponding data type values in the snapshot. The verifier will then set a verification status value 245 for the program to false and abort (490) the verification process. If a stack status match is detected at step 486, then the verifier continues processing at step 500 (FIG. 6F).

Figure 6F:
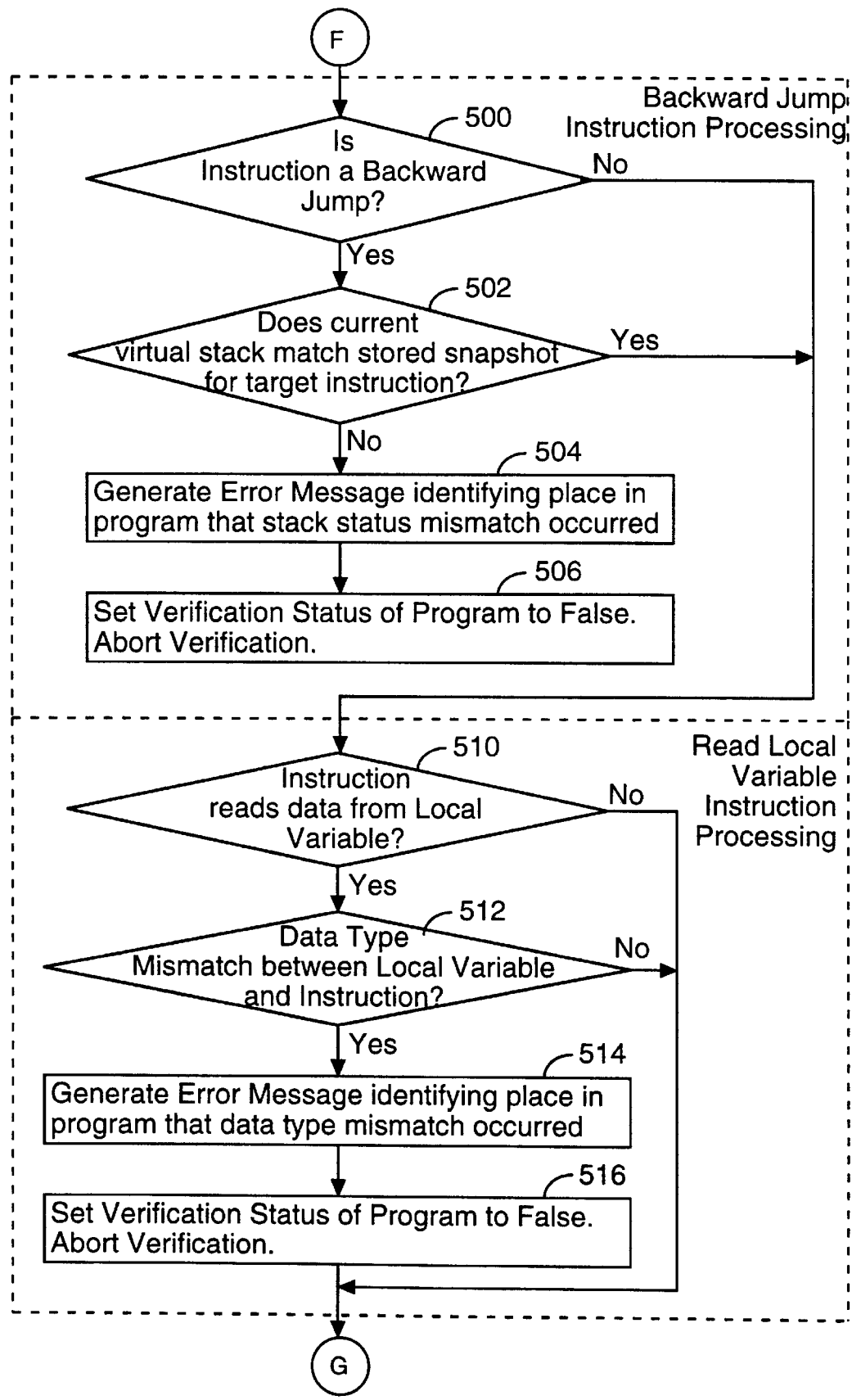

Referring to FIG. 6F, if the currently selected instruction causes a conditional or unconditional jump or branch backward in the program (step 500) then the verifier compares (502) the virtual stack snapshot information stored in the snapshot portion 350 of the stack snapshot storage structure 346 associated with the target of the backward jump (which has already been stored in step 436) with the current state of the virtual stack. If the comparison shows that the current state and the snapshot do not match, then an error message is generated (504) identifying the place in the bytecode program where the stack status mismatch occurred. In the preferred embodiment, a mismatch will arise if the current virtual stack and snapshot do not contain the same number or types of entries or if any data type entry in the current virtual stack does not match the corresponding data type entry in the snapshot. The verifier will then set a verification status value 245 for the program to false and abort (506) the verification process.

If a stack status match is detected (at step 502) or if the instruction is not a backward jump (at step 500), then the verifier continues processing at step 510.

If the currently selected instruction reads data from a local variable (510), the verifier will compare (512) the data type code information previously stored in the corresponding virtual local variable with the data type requirements (if any) of the currently selected instruction. If a mismatch is detected (512) between the data type information stored in the virtual local variable and the data type requirements of the currently selected instruction, then a message is generated (514) identifying the place in the bytecode program where the mismatch occurred. The verifier will then set a verification status value 245 for the program to false and abort (516) the verification process.

If the currently selected instruction does not read data from a local variable (510) or the data type comparison at step 512 results in a match, then the verifier continues processing the currently selected instruction at step 520.

Figure 6G:
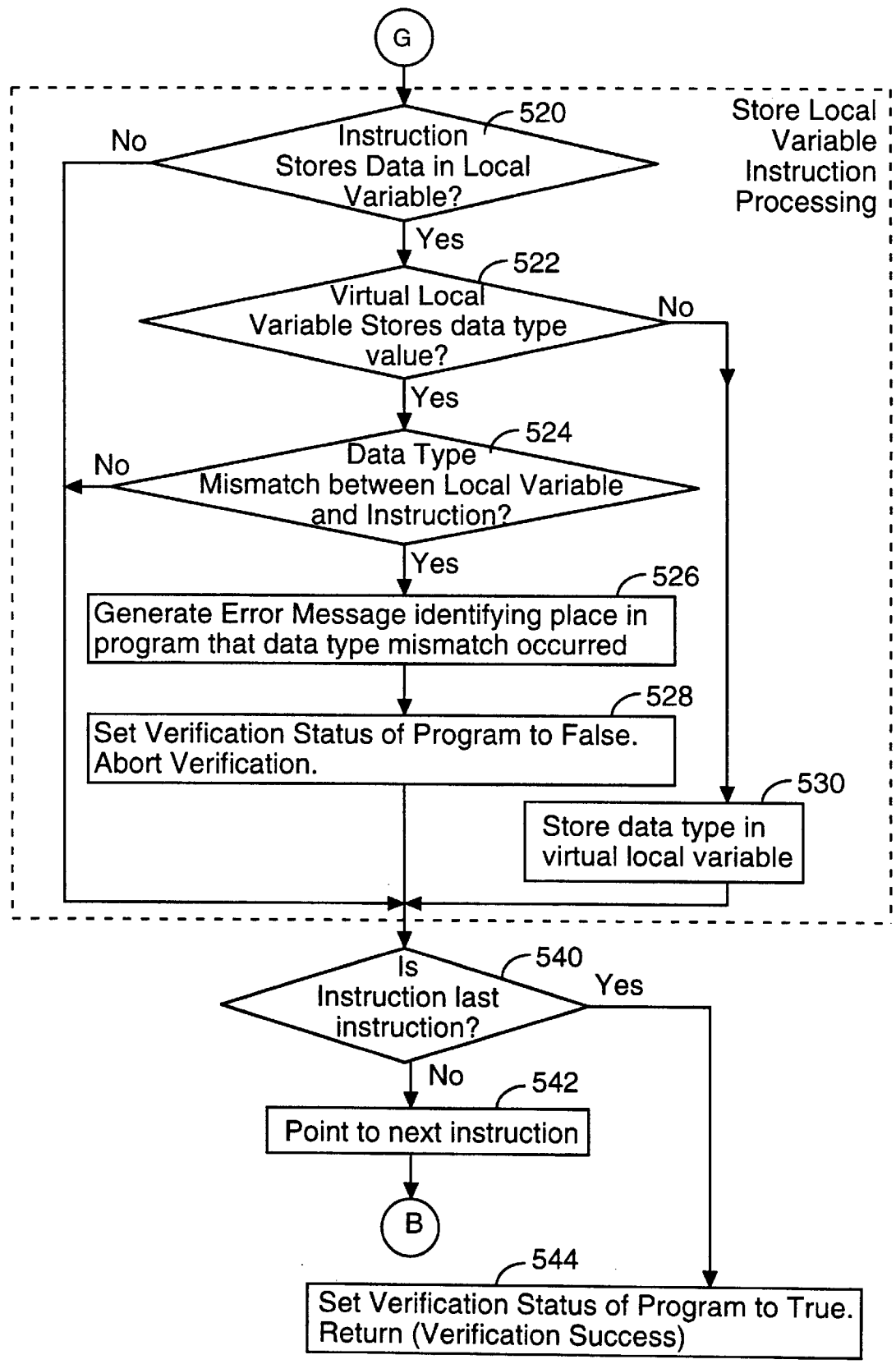

Referring to FIG. 6G, if the currently selected instruction stores data into a local variable (520), the corresponding virtual local variable is inspected (522) to determine whether it stores a data type value. If the virtual local variable does store a data type value (indicating that data has been previously stored in the local variable), the verifier compares the data type information in the virtual local variable with the data type associated with the currently selected bytecode instruction (524). If a mismatch is detected (524) between the data type information stored in the virtual local variable and the data type requirements of the currently selected instruction, then a message is generated (526) identifying the place in the bytecode program where the mismatch occurred. The verifier will then set a verification status value 245 for the program to false and abort (528) the verification process.

If the currently selected instruction does not store data into a local variable (520), processing for the currently selected instruction is completed. If the currently selected instruction stores data into a local variable, but the virtual local variable does not store a data type value (indicating that no instruction which would store data in the local variable has yet been processed by the verifier), then the data type associated with the selected bytecode instruction is stored in the virtual local variable (step 530).

Next, the verifier checks (540) to see if this is the last instruction in the bytecode program 340 to be processed. If more instructions remain to be processed, then the verifier loads (542) the next instruction, and repeats the verification process starting at step 432. If no more instructions are to be processed, then the verifier will set a verification status value 245 for the program to True (544), signaling the completion of the verification process.

Bytecode Interpreter

Figure 7:
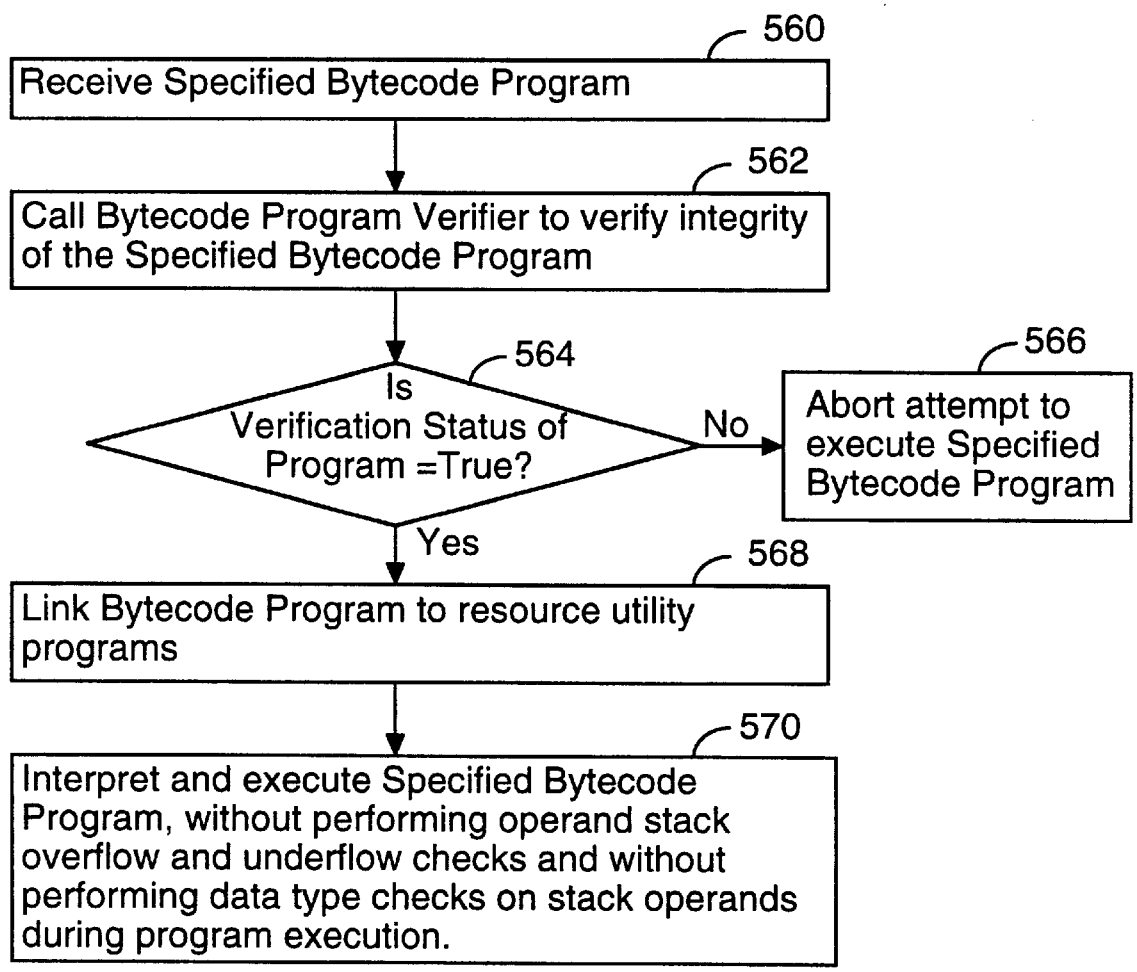
FIG. 7 represents a flow chart of the bytecode program interpreter process in the preferred embodiment of the present invention.

Referring to flow chart in FIG. 7 and Appendix 3, the execution of the bytecode interpreter 242 will be described. Appendix 3 lists a pseudocode representation of the bytecode interpreter.

After a specified bytecode program has been received or otherwise selected (560) as a program to be executed, the bytecode program interpreter 242 calls (562) the bytecode verifier 240 to verify the integrity of the specified bytecode program. The bytecode verifier is described above.

If the verifier returns a "verification failure" value (564), the attempt to execute the specified bytecode program is aborted by the interpreter (566).

If the verifier 242 returns a "Verification Success" value (564), the specified bytecode program is linked (568) to resource utility programs and any other programs, functions and objects that may be referenced by the program. Such a linking step is a conventional pre-execution step in many program interpreters. Then the linked bytecode program is interpreted and executed (570) by the interpreter. The bytecode interpreter of the present invention does not perform any operand stack overflow and underflow checking during program execution and also does not perform any data type checking for data stored in the operand stack during program execution. These conventional stack overflow, underflow and data type checking operations can be skipped by the present invention because the verifier has already verified that error of these types will not be encountered during program execution.

The program interpreter of the present invention is especially efficient for execution of bytecode programs having instruction loops that are executed many times, because the operand stack checking instructions are executed only once for each bytecode in each such instruction loop in the present invention. In contrast, during execution of a program by a conventional interpreter, the interpreter must continually monitor the operand stack for overflows (i.e., adding more data to the stack than the stack can store) and underflows (i.e., attempting to pop data off the stack when the stack is empty). Such stack monitoring must normally be performed for all instructions that change the stack's status (which includes most all instructions). For many programs, stack monitoring instructions executed by the interpreter account for approximately 80% of the execution time of an interpreted computed program. As a result, the interpreter of the present invention will often execute programs at two to five times the speed of a conventional program interpreter running on the same computer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

TABLE 1

BYTECODES IN OAK LANGUAGE

| INSTRUCTION NAME | SHORT DESCRIPTION |
| --- | --- |
| aaload | load object reference from array |
| aastore | store object reference into object reference array |
| aconst_null | push null object |
| aload | load local object variable |
| areturn | return object reference from function |
| arraylength | get length of array |
| astore | store object reference into local variable |
| astore_<n> | store object reference into local variable |
| athrow | throw exception |
| bipush | push one-byte signed integer |
| breakpoint | call breakpoint handler |
| catchsetup | set up exception handler |
| catchteardown | reset exception handler |
| checkcast | make sure object is of a given type |
| df2 | convert double floating point number to single precision floating point number |
| d2i | convert double floating point number to integer |
| d2l | convert double floating point number to long integer |
| dadd | add double floating point numbers |
| daload | load double floating point number from array |
| dastore | store double floating point number into array |
| dcmpg | compare two double floating point numbers (return 1 on incomparable) |
| dcmpl | compare two double floating point numbers (return −1 on incomparable) |
| dconst_<d> | push double floating point number |
| ddiv | divide double floating point numbers |
| dload | load double floatng point number from local variable |
| dload_<n> | load double floating point number from local variable |
| dmod | perform modulo function on double floating point numbers |
| dmul | multiply double floating point numbers |
| dneg | negate double floating point number |
| dreturn | return double floating point number from |

TABLE 1-continued

BYTECODES IN OAK LANGUAGE

| INSTRUCTION NAME | SHORT DESCRIPTION |
|---|---|
| dstore | store double floating point number into local variable |
| dstore_<n> | store double floating point number into local variable |
| dsub | subtract double floating point numbers |
| dup | duplicate top stack word |
| dup2 | duplicate top two stack words |
| dup2_x1 | duplicate top two stack words and put two down |
| dup2_x2 | duplicate top two stack words and put three down |
| dup_x1 | duplicate top stack word and put two down |
| dup_x2 | duplicate top stack word and put three down |
| f2d | convert single precision floating point number to double floating point number |
| f2i | convert single precision floating point number to integer |
| f2l | convert Single precision floating point number to long integer |
| fadd | add single precision floating point numbers |
| faload | load single precision floating point number from array |
| fastore | store into single precision floating point number array |
| fempg | compare single precision floating point numbers (return 1 on incomparable) |
| fempl | compare Single precision floating point number (return −1 on incomparable) |
| fconst_<f> | push single precision floating point number |
| fdiv | divide single precision floating point numbers |
| fload | load single precision floating point number from local variable |
| fload_<n> | load single precision floating point number from local variable |
| fmod | perform modulo function on single precision floating point numbers |
| fmul | multiply single precision floating point numbers |
| fneg | negate single precision floating point number |
| freturn | return single precision floating point number from function |
| fstore | store single precision floating point number into local variable |
| fstore_<n> | store single precision floating point number into local variable |
| fsub | subtract single precision floating point numbers |
| getfield | fetch field from object |
| getstatic | set static field from class |
| goto | branch always |
| i2d | convert integer to double floating point number |
| i2f | convert integer to single precision floating point number |
| i2l | convert integer to long integer |
| iadd | add integers |
| iaload | load integer from array |
| iand | boolean AND two integers |
| iastore | store into integer array |
| iconst_<n> | push integer |
| iconst_m1 | push integer constant minus 1 |
| idiv | integer divide |
| if_acmpeq | branch if objects same |
| if_acmpne | branch if objects not same |
| if_icmpeq | branch if integers equal |
| if_icmpge | branch if integer greater than or equal to |
| if_icmpgt | branch if integer greater than |
| if_icmple | branch if integer less than or equal to |
| if_icmplt | branch if integer less than |
| if_icmpne | branch if integers not equal |
| ifeq | branch if equal to 0 |
| ifge | branch if greater than or equal to 0 |
| ifgt | branch if greater than 0 |
| ifle | branch if less than or equal to 0 |
| iflt | branch if less than 0 |
| ifne | branch if not equal to o |
| iinc | increment local variable by constant |
| iload | load integer from local variable |
| iload_<n> | load integer from local variable |
| imod | perform modulo function on integers |
| imul | multiply integers |
| ineg | negate integer |
| instanceof | determine if object is of given type |
| in2byte | convert integer to signed byte |
| in2char | convert integer to char |
| invokeinterface | invoke interface method |
| invokemethod | invoke class method |
| invokesuper | invoke superclass method |
| ior | boolean OR two integers |
| ireturn | return integer from function |
| ishl | integer shift left |
| lshr | integer arithmetic shift right |
| istore | store integer into local variable vindex |
| istore_<n> | store integer into local variable n |
| isub | subtract integers |
| iushr | integer logical shift right |
| ixor | boolean XOR two integers |
| jsr | jump to subroutine |
| l2d | convert long integer into double floating point number |
| l2f | convert long integer into single precision floating point number |
| l2i | convert long integer into integer |
| ladd | add long integers |
| laload | load long integer from array |
| land | boolean AND two long integers |
| lastore | store into long integer array |
| lcmp | compare long integers |
| lconst_<l> | push long integer constant |
| ldc1 | push item from constant pool |
| ldc2 | push item from constant pool |
| ldc2w | push long or double from constant pool |
| ldiv | divide long integers |
| lload | load long integer from local variable |
| lload_<n> | load long integer from local variable |
| lmod | perform modulo function on long integers |
| lmul | multiply long integers |
| lneg | Negate long integer |
| lookupswitch | Access jump table by key match and jump |
| lor | boolean OR two long integers |
| lreturn | return long integer from function |
| lshl | long integer shift left |
| lshr | long integer arithmetic shift right |
| lstore | store long integer into local variable |
| lstore_<n> | store long integer into local variable |
| lsub | subtract long integers |
| lushr | long integer logical shift right |
| lxor | boolean XOR long integers |
| monitorenter | enter monitored region of code |
| monitorexit | exit monitored region of code |
| new | create new object |
| newarray | allocate new array |
| newfromname | create new object from name |
| nop | do nothing |
| pop | pop top stack word |
| pop2 | pop top two stack words |
| putfield | set field in object |
| putstatic | set static field in class |
| ret | return from subroutine |
| return | return (void) from procedure |
| saload | load signed byte from array |
| sastore | store into signed byte array |
| siaload | load unsigned short from array |
| siastore | store into unsigned short array |
| sipush | push two-byte signed integer |
| tableswitch | access jump table by index and jump |
| verifystack | verify stack empty |

- 36 -

APPENDIX 1
Pseudocode for Class Loader

```
    User selects an object (the "referenced object") to view.  (For example, the
 5  user selection may be performed by selecting a hyperlink to the object in a
    document or other object.)
    Open connection to server storing referenced object.
    Receive handle to referenced object, including data type.
    Check if data type is known to user's system (i.e., does user have a viewer
10          for objects of the received data type)
    If data type is unknown
            {
            Open second connection to same server
            Request viewer for specified data type:
15  If Success
                    /* Hybrid System Option: Check for Non-bytecode viewer */
                    {
                    If received viewer is not a bytecode program
                            {
20                          Determine whether or not to accept viewer
                            If viewer is not accepted
                                    Delete received viewer
                            Else    /* non-bytecode viewer is accepted */
                                    Goto FinishObjectDownload
25                          }
                    /* Verification and Registration Procedure */
                    Else
                            {
                            Execute Bytecode Verifier on received viewer
30                          If verification is successful
                                    {
                                    /* Registration of Viewer */
                                    Mark received viewer as verified
                                    Store viewer in local viewer library
35                                  Add data type to list of known data types
                                    }
                            Else
                                    Delete received viewer
                            }
```

- 37 -

```
                    }

If data type is still unknown
            {
5           Search other server sites for viewer for specified data type
            If Success
                    {same verification and registration procedure as above}
            }
        If data type is still unknown
10          {
            Abort downloading of referenced object.
            Inform user that viewer for referenced object cannot be found.
            }
        }
15
    FinishObjectDownload:    /* Branch to this point for non-bytecode viewers */

Complete downloading of referenced object.
    If downloaded object includes embedded bytecode program(s)
20      {
        Execute Bytecode Verifier on embedded program(s)
        If verification is successful
                Mark embedded programs as verified
        Else
25          {
            Delete received object
            Abort downloading procedure
            }
        }
30  View referenced object with viewer for data type associated with referenced
    object.
```

- 38 -

APPENDIX 2

Pseudocode for OAK Bytecode Verifier

```
        Receive Bytecode Program to be verified.
 5      Create Virtual Operand Stack Data Structure for storing stack status
            information and Virtual Local Variable Array for storing local variable
            data type information.
        Create data structure for storing Virtual Stack Snapshots.

10      First Pass through Bytecode Program:
            Locate all instructions that are the targets of conditional and
            unconditional jumps or branches (i.e., can be entered from more than
            one prior instruction).

15          Store list of such target instructions in Virtual Stack Snapshot data
            structure.

Second Pass through Bytecode Program:
            Set VerificationSuccess to True
20          Do Until Last Bytecode Instruction has been processed:
                {
                Select next bytecode instruction (in sequential order in program)
                If instruction is in list of target instructions
                    {
25                  If snapshot of virtual stack for this instruction already exists
                        {
                        Compare current state of virtual stack with stored snapshot
                        If snapshot does not match current virtual stack state
                            {
30                          Print message identifying place in program that stack
                            mismatch occurred
                            Abort Verification
                            Set VerificationSuccess to False
                            Return
35                          }
                        }
                    Else
                        Store snapshot of current virtual stack status
                    }
```

- 39 -

```
                Case(Instruction Type):
                {
                Case=Instruction pops data from Operand Stack
                    {
 5                  Check for Stack Underflow
                    If Stack has Underflowed
                        {
                        Print message identifying place in program that
                        underflow occurred
10                      Abort Verification
                        Return
                        }
                    Compare data type of each operand popped from stack with
                    data type required (if any) by the bytecode instruction
15                  If type mismatch
                        {
                        Print message identifying place in program that data
                        type mismatch occurred
                        Set VerificationSuccess to False
20                      }
                    Delete information from Virtual Stack for popped operands
                    Update Stack Counter
                    }

25              Case=Instruction pushes data onto Operand Stack
                    {
                    Check for Stack Overflow
                    If Stack has Overflowed
                        {
30                      Print message identifying place in program that overflow
                            occurred
                        Abort Verification
                        Set VerificationSuccess to False
                        Return
35                      }
                    Add information to Virtual Stack indicating data type of data
                    pushed onto operand stack
                    Update Stack Counter
                    }
```

- 40 -

```
Case=Instruction is a forward jump or branch instruction
    {
    If snapshot of virtual stack for the target instruction already
    exists
        {
        Compare current state of virtual stack with stored
            snapshot
        If snapshot does not match current virtual stack state
            {
            Print message identifying place in program that
            stack mismatch occurred
            Abort Verification
            Set VerificationSuccess to False
            Return
            }
        }
    Else
        Store snapshot of current virtual stack state as snapshot
        for the target instruction;
    }

Case=Instruction is an end of loop backward jump or other
backward jump or branch instruction:
    {
    Compare current virtual stack state with stored snapshot for
    target instruction
    If current virtual stack state does not match stored snapshot
        {
        Print message identifying place in program that stack
        mismatch occurred
        Abort Verification
        Set VerificationSuccess to False
        Return
        }
    }

Case=Instruction reads data from local variable
    {
```

- 41 -

```
            Compare data type of each datum read from local variable
            with data type required (if any) by the bytecode instruction
            If type mismatch
                {
 5              Print message identifying place in program that data
                type mismatch occurred
                Set VerificationSuccess to False
                }
            }
10
        Case=Instruction stores data into a local variable
            {
            If corresponding virtual local variable already stores a data
            type value
15              {
                Compare data type value stored in virtual local variable
                with data type of datum that would be stored in the
                corresponding local variable (as determined by the data
                type handled by the current bytecode instruction)
20              If type mismatch
                    {
                    Print message identifying place in program that data
                    type mismatch occurred
                    Set VerificationSuccess to False
25                  }
                }
            Else
                Add information to Virtual Local Variable indicating data
                type of data that would be stored in corresponding local
30              variable
            }

} /* EndCase */
    } /* End of Do Loop */
35  Return (VerificationSuccess)
```

- 42 -

APPENDIX 3
Pseudocode for Bytecode Interpreter

```
       Receive Specified Bytecode Program to be executed
 5     Call Bytecode Verifier to verify Specified Bytecode Program
       If Verification Success
           {
           Link Specified Bytecode Program to resource utility programs.

10         Interpret and execute Specified Bytecode Program instructions without
           performing operand stack overflow and underflow checks and without
           performing data type checks on operands stored in operand stack.
           }
```

What is claimed is:

1. A method of operating a distributed computer system having a plurality of distinct computers, the method comprising steps of:
   a) in a first computer, storing viewer programs, each viewer program enabling a user thereof to view objects of an associated data type;
   b) in said first computer, enabling a user to select a reference to an object located in a second computer;
   c) said first computer responding to user selection of said reference by establishing a first communication link between said first computer and said second computer and initiating retrieval of said object from said second computer including retrieving data type information associated with said object;
   d) in said first computer, determining whether said viewer programs stored in said first computer include a viewer program associated with said retrieved data type;
   e) when said determination in step (d) is negative, determining whether a viewer program associated with said retrieved data type is stored in said second computer;
   f) when said determination in step (e) is positive, loading a copy of said viewer program associated with said retrieved data type into said first computer.

2. The method of claim 1, further including the steps of: when said determination in step e is negative, determining whether a viewer program associated with said second data type is stored in any of a predefined set of other computers, and when such determination is positive, performing step f.

3. A method of operating a distributed computer system having a plurality of distinct computers, the method comprising steps of:
   a) in a first computer, storing a first library of viewer programs, each viewer program enabling a user thereof to view objects of an associated data type;
   b) in said second computer, storing objects and a second library of viewer programs, each viewer program in said first and second libraries of viewer programs enabling a user of said second computer to view objects of an associated data type;
   c) in said second computer, enabling said user of said second computer to select an object and determining said selected object's associated data type;
   d) in said second computer, determining whether said viewer programs stored in said second computer include a viewer program associated with said selected object's data type;
   e) when said determination in step (d) is negative, determining whether a viewer program associated with said selected object's data type is stored in said first computer;
   f) when said determination in step (e) is positive, loading a copy of said viewer program associated with said selected object's data type into said second computer.

4. The method of claim 3, further including the steps of: when said determination in step e is negative, determining whether a viewer program associated with said second data type is stored in any of a predefined set of other computers, and when such determination is positive, performing step f.

5. A method of operating a first computer in a distributed computer system having a plurality of distinct computers, the method comprising steps of:
   a) in a first computer, storing object application programs, each object application program enabling a user thereof to utilize data in objects of an associated data type;
   b) in the first computer, enabling a user to utilize data in a first object having an associated first data type using a first one of the object application programs; the data in the first object including link data referencing a second object of a second data type, the link data identifying a second computer in which the second object is located;
   c) in the first computer, enabling the user to select the link data;
   d) the first computer responding to user selection of the link data by establishing a first communication link between the first computer and the second computer and initiating retrieval of the second object from the second computer including retrieving data type information associated with the second object;
   e) the first computer, determining whether the object application programs stored in the first computer include an object application program associated with the second data type;
   f) when the determination in step (e) is negative, determining whether an object application program associated with the second data type is stored in the second computer;
   g) when the determination in step (g) is positive, loading a copy of the object application program associated with the second data type into the first computer.

6. The method of claim 5, further including the steps of: when the determination in step f is negative, determining whether an object application program associated with the second data type is stored in any of a predefined set of other computers, and when such determination is positive, performing step g.

7. The method of claim 5, further including the steps of: after performing step g, executing a verification procedure on the loaded copy of the object application program to determine whether the loaded copy of the object application program meets predetermined operand stack usage criteria, and disabling execution of the loaded copy of the object application program if the verification procedure makes a negative determination.

8. A computer program product for use in conjunction with a computer system, the computer program product comprising a computer readable storage medium and a computer program mechanism embedded therein, the computer program mechanism comprising:
   a user interface control program for enabling said user to select a reference to a first object stored in a computer memory associated with a first computer; and
   an inter-computer link control program for responding to user selection of an object reference by establishing a first communication link between a second computer and the first computer and initiating retrieval of the one object from the first computer including retrieving data type information associated with the one object;
   the user interface control program including search instructions for determining whether there is stored in a computer memory associated with the second computer an object application program associated with the retrieved data type, and, when said determination is negative, for attempting to locate an object application program associated with the retrieved data type in the first computer; and
   the inter-computer link control program including downloading instructions for loading a copy of the object application program associated with the retrieved data type into the computer memory associated with the second computer when the search instructions locate in the first computer the object application program associated with the retrieved data type.

9. The computer program product of claim 8, the search instructions including instructions that attempt to locate an object application program associated with the second data type in any of a predefined set of other computers when no object application program associated with the second data type if found in the first computer.

10. The computer program product of claim 8, further including:

a verification procedure that is used to determine whether the loaded copy of the object application program meets predetermined operand stack usage criteria, and instructions that disables execution of the loaded copy of the object application program if the verification procedure makes a negative determination.

11. A computer data signal embodied in a carrier wave, comprising:

a user interface control program for enabling said user to select a reference to a first object stored in a computer memory associated with a first computer; and an inter-computer link control program for responding to user selection of an object reference by establishing a first communication link between a second computer and the first computer and initiating retrieval of the one object from the first computer including retrieving data type information associated with the one object;

the user interface control program including search instructions for determining whether there is stored in a computer memory associated with the second computer an object application program associated with the retrieved data type, and, when said determination is negative, for attempting to locate an object application program associated with the retrieved data type in the first computer; and the inter-computer link control program including downloading instructions for loading a copy of the object application program associated with the retrieved data type into the computer memory associated with the second computer when the search instructions locate in the first computer the object application program associated with the retrieved data type.

12. The computer data signal of claim 11, the search instructions including instructions that attempt to locate an object application program associated with the second data type in any of a predefined set of other computers when no object application program associated with the second data type if found in the first computer.

13. The computer data signal of claim 11, further including:

a verification procedure that is used to determine whether the loaded copy of the object application program meets predetermined operand stack usage criteria, and instructions that disables execution of the loaded copy of the object application program if the verification procedure makes a negative determination.

* * * * *